US011411628B2

(12) United States Patent
Subramanian et al.

(10) Patent No.: US 11,411,628 B2
(45) Date of Patent: *Aug. 9, 2022

(54) METHODS FOR BEAM DETERMINATION AFTER BEAM PAIR LINK INDICATION

(71) Applicant: QUALCOMM Incorporated, San Diego, CA (US)

(72) Inventors: Sundar Subramanian, San Diego, CA (US); Xiao Feng Wang, San Diego, CA (US); Juergen Cezanne, Ocean Township, NJ (US); Bilal Sadiq, Basking Ridge, NJ (US); Muhammad Nazmul Islam, Littleton, MA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,542

(22) Filed: Sep. 14, 2020

(65) Prior Publication Data

US 2020/0412428 A1     Dec. 31, 2020

Related U.S. Application Data

(63) Continuation of application No. 16/192,020, filed on Nov. 15, 2018, now Pat. No. 10,778,306.
(Continued)

(51) Int. Cl.
*H04B 7/06* (2006.01)
*H04B 7/08* (2006.01)
(Continued)

(52) U.S. Cl.
CPC ......... *H04B 7/0617* (2013.01); *H04B 7/0695* (2013.01); *H04B 7/088* (2013.01);
(Continued)

(58) Field of Classification Search
CPC .... H04B 7/0617; H04B 7/088; H04B 7/0695; H04B 7/2121; H04B 7/2123;
(Continued)

(56) References Cited

U.S. PATENT DOCUMENTS 9,538,527 B2   1/2017 Yan et al.
10,778,306 B2 * 9/2020 Subramanian ...... H04W 72/042
(Continued)

FOREIGN PATENT DOCUMENTS

RU         2562800 C1    9/2015
WO   WO-2016022924 A1    2/2016
(Continued)

OTHER PUBLICATIONS

Andersson, Karl, Seraj Al Mahmud Mostafa, and Raihan Ui-Islam. "Mobile VoIP user experience in LTE." 2011 IEEE 36th Conference on Local Computer Networks. IEEE, 2011. (Year: 2011).*
(Continued)

*Primary Examiner* — Sharad Rampuria
(74) *Attorney, Agent, or Firm* — Danai Nelisile Mhembere; Holland & Hart LLP

(57) ABSTRACT

Methods, systems, and devices for wireless communications are described that provide for signaling and switching of beam pair links (BPLs) for directional transmission beams between a base station and a user equipment (UE). A threshold value may be determined, which corresponds to an amount of time for a UE to receive and decode control information, and apply a different BPL than a current BPL that that is in use. The UE may maintain a BPL for data, which is used during data transmission time intervals (TTIs) until an indication is received to change the BPL for data. The UE and the base station may determine to change between BPLs based at least in part on the threshold value and a scheduling offset between a control channel transmis-
(Continued)

sion that allocates resources for a data TTI and a start of the data TTI.

3 Claims, 20 Drawing Sheets

Related U.S. Application Data

(60) Provisional application No. 62/588,180, filed on Nov. 17, 2017.

(51) Int. Cl.
*H04W 72/12* (2009.01)
*H04W 72/04* (2009.01)

(52) U.S. Cl.
CPC ....... *H04W 72/042* (2013.01); *H04W 72/046* (2013.01); *H04W 72/1205* (2013.01); *H04W 72/1289* (2013.01)

(58) Field of Classification Search
CPC ......... H04W 72/1289; H04W 72/1205; H04W 72/046; H04W 72/042; H04W 72/04; H04W 72/12; H04W 76/00; H04J 2203/0069; H04Q 2213/394
See application file for complete search history.

(56) References Cited

U.S. PATENT DOCUMENTS

| | | | |
|---|---|---|---|
| 2017/0302355 A1 | 10/2017 | Islam et al. | |
| 2018/0309496 A1* | 10/2018 | Lee | H04B 7/088 |
| 2019/0007122 A1 | 1/2019 | Furuskog et al. | |
| 2019/0081753 A1 | 3/2019 | Jung et al. | |
| 2019/0158163 A1 | 5/2019 | Subramanian et al. | |

FOREIGN PATENT DOCUMENTS

| | | |
|---|---|---|
| WO | WO-2017028676 A1 | 2/2017 |
| WO | WO2017083489 A1 | 5/2017 |
| WO | WO-2017192889 A1 | 11/2017 |

OTHER PUBLICATIONS

International Search Report and Written Opinion—PCT/US2018/061519—ISA/EPO—dated Mar. 13, 2019.
Samsung Catt Huawei Hisilicon NTT Docomo Mediatek Intel Oppo Spreadtrum AT & T Interdigital CHTTL KDDI LG Electronics Sony China UNI: "WF on Beam Management," 3GPP Draft; R1-1719059, 3rd Generation Partnership Project (3GPP), Mobile Competence Centre; 650, Route Des Lucioles; F-06921 Sophia-Antipolis Cedex; France, vol. RAN WG1, No. Prague, Czech; 20171009-20171013, Oct. 13, 2017, XP051353538, 8 pages, Retrieved from the Internet: URL: http://www.3gpp.org/ftp/tsg_ran/WG1_RL1/TSGR1_90b/Docs/ [retrieved on Oct. 13, 2017].
Samsung: "Discussion on Beam Indication for PDSCH," 3GPP Draft; R1-1717612, 3rd Generation Partnership Project (3GPP), Mobile Competence Centre; 650, Route Des Lucioles; F-06921 Sophia-Antipolis Cedex; France, vol. RAN WG1, No. Prague, Czech; Oct. 9, 2017-Oct. 13, 2017, Oct. 8, 2017, XP051340798, 5 pages, Retrieved from the Internet: URL: http://www.3gpp.org/ftp/Meetings_3GPP_SYNC/RAN1/Docs/ [retrieved on Oct. 8, 2017].
Taiwan Search Report—TW107140782—TIPO—dated Nov. 20, 2021.

* cited by examiner

METHODS FOR BEAM DETERMINATION AFTER BEAM PAIR LINK INDICATION

CROSS REFERENCES

The present Applications for Patent is a Continuation of U.S. patent application Ser. No. 16/192,020 by SUBRAMANIAN, et al., entitled, "METHODS FOR BEAM DETERMINATION AFTER BEAM PAI LINK INDICATION" filed Nov. 15, 2018, which claims the benefit of U.S. Provisional Patent Application No. 62/588,180 by SUBRAMANIAN, et al., entitled "METHODS FOR BEAM DETERMINATION AFTER BEAM PAIR LINK INDICATION," filed Nov. 17, 2017, assigned to the assignee hereof, and expressly incorporated herein.

BACKGROUND

The following relates generally to wireless communication, and more specifically to methods for beam determination after beam pair link indication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, base stations and UEs may transmit using relatively high frequencies referred to as millimeter wave (mmW) frequencies, in which a base station and a UE may communicate via one or more directional beams. A transmitter (e.g. a base station) may engage in a beam sweeping procedure to establish an active beam pair with a receiver (e.g., a UE). An active beam pair may include an active transmit beam of the transmitter and a corresponding active receive beam of the receiver. The transmit beams and the receive beams in an active beam pair may be refined through, for example, beam refinement procedures. When the base station and UE identify a preferred beam, an active beam pair link (BPL) may be established for communications. In some cases, two or more BPLs may be identified, and a base station and UE may switch to different BPLs for transmissions based on channel conditions, for example. Techniques that may provide more efficient change of BPLs at a UE and base station may be desirable to help enhance network efficiency.

SUMMARY

The described techniques relate to improved methods, systems, devices, or apparatuses that support beam determination after beam pair link indication. Generally, the described techniques provide for signaling and switching of beam pair links (BPLs) for directional transmission beams between a base station and a user equipment (UE). In some cases, a threshold value may be determined, which corresponds to an amount of time for a UE to receive and decode control information, and apply a different BPL than a current BPL that is in use. In some cases, the UE may maintain a BPL for data, which is used during data TTIs until an indication is received to change the BPL for data. In some cases, the UE and the base station may determine to change between BPLs based at least in part on the threshold value and a scheduling offset between a control channel transmission that allocates resources for a data transmission time interval (TTI) and a start of the data TTI.

In some cases, if the scheduling offset is less than the threshold value, the UE is unable and is not expected to switch beams prior to the start of the data TTI. In some cases, if the scheduling offset is less than the threshold value, the UE may ignore a BPL indication provided in the control channel information and receive a data TTI using the BPL for data that was used in a prior data TTI. In other cases, if the scheduling offset is less than the threshold value, the UE may identify a BPL indication provided in the control information and verify that the BPL for data used for the corresponding data TTI matches the indicated BPL. In the event that the BPL indicated in the control information does not match the BPL for data used by the UE for the corresponding data TTI, the UE may determine that an error occurred in the receipt of a prior BPL indication (e.g., due to a failure to receive and decode a prior control information transmission), and the UE may enter a procedure to correct the error (e.g., via a random access request or control channel transmission on another carrier). In some cases, the procedure to correct the error may include identifying a BPL indication provided in the control information and change the BPL for data to the indicated BPL for data TTIs that start after the time of the control channel transmission plus the threshold value.

In some cases, if the scheduling offset is greater than the threshold value, the UE may switch the BPL for data to the BPL that is indicated in the control information at the start of the corresponding data TTI. The UE may apply the BPL for data for all subsequent TTIs until it receives another control information from which the UE may determine that it is to change its BPL for data.

In cases where the base station determines that the BPL for data communication is to be changed based on channel conditions, the base station may indicate the change in a subsequent control information transmission. In some cases, the base station may identify the threshold value at the UE that corresponds to the amount of time for the UE to decode an indication of a BPL switch and apply a different BPL. The base station may then provide an indication of a change in the BPL for data to the UE based on the scheduling offset, the time of the control information transmission, the threshold value, and the BPL indication. All this information indicates to the UE whether the BPL for data will change, a BPL change time, and the new value for the BPL for data.

A method of wireless communication is described. The method may include establishing, at a UE, a first connection with a base station using a first beam pair link (BPL), maintaining a BPL for data, which is initialized with the first BPL and is used during data transmission time intervals (TTIs), identifying a threshold value corresponding to an amount of time needed by the UE to decode an indication of a BPL switch and apply a different BPL than the first BPL based at least in part on the indication, receiving a first control information transmission at a first time, the first control information transmission including a scheduling offset, an assignment for a first data TTI that starts at a second time corresponding to the first time plus the scheduling offset, and a BPL indication, determining, based at least in part on the threshold value and the scheduling offset, whether to switch the BPL for data and a switching time for making the switch, and switching the BPL for data to a second BPL at the switching time responsive to determining to switch the BPL for data.

An apparatus for wireless communication is described. The apparatus may include means for establishing, at a user equipment, a first connection with a base station using a first beam pair link (BPL), means for maintaining a BPL for data, which is initialized with the first BPL and is used during data transmission time intervals (TTIs), means for identifying a threshold value corresponding to an amount of time needed by the UE to decode an indication of a BPL switch and apply a different BPL than the first BPL based at least in part on the indication, means for receiving a first control information transmission at a first time, the first control information transmission including a scheduling offset, an assignment for a first data TTI that starts at a second time corresponding to the first time plus the scheduling offset, and a BPL indication, means for determining, based at least in part on the threshold value and the scheduling offset, whether to switch the BPL for data and a switching time for making the switch, and means for switching the BPL for data to a second BPL at the switching time responsive to determining to switch the BPL for data.

Another apparatus for wireless communication is described. The apparatus may include a processor, memory in electronic communication with the processor, and instructions stored in the memory. The instructions may be operable to cause the processor to establish, at a user equipment, a first connection with a base station using a first beam pair link (BPL), maintain a BPL for data, which is initialized with the first BPL and is used during data transmission time intervals (TTIs), identify a threshold value corresponding to an amount of time needed by the UE to decode an indication of a BPL switch and apply a different BPL than the first BPL based at least in part on the indication, receive a first control information transmission at a first time, the first control information transmission including a scheduling offset, an assignment for a first data TTI that starts at a second time corresponding to the first time plus the scheduling offset, and a BPL indication, determine, based at least in part on the threshold value and the scheduling offset, whether to switch the BPL for data and a switching time for making the switch, and switch the BPL for data to a second BPL at the switching time responsive to determining to switch the BPL for data.

A non-transitory computer-readable medium for wireless communication is described. The non-transitory computer-readable medium may include instructions operable to cause a processor to establish, at a user equipment, a first connection with a base station using a first beam pair link (BPL), maintain a BPL for data, which is initialized with the first BPL and is used during data transmission time intervals (TTIs), identify a threshold value corresponding to an amount of time needed by the UE to decode an indication of a BPL switch and apply a different BPL than the first BPL based at least in part on the indication, receive a first control information transmission at a first time, the first control information transmission including a scheduling offset, an assignment for a first data TTI that starts at a second time corresponding to the first time plus the scheduling offset, and a BPL indication, determine, based at least in part on the threshold value and the scheduling offset, whether to switch the BPL for data and a switching time for making the switch, and switch the BPL for data to a second BPL at the switching time responsive to determining to switch the BPL for data.

In some examples of the method, apparatus, and non-transitory computer-readable medium described above, the determining comprises determining to switch the BPL for data based at least in part on determining that the scheduling offset may be greater than or equal to the threshold value, and to switch the BPL for data to the second BPL at the second time. In some examples of the method, apparatus, and non-transitory computer-readable medium described above, the determining comprises determining to maintain the first BPL as the BPL for data based on determining that the scheduling offset may be less than the threshold value.

Some examples of the method, apparatus, and non-transitory computer-readable medium described above may further include processes, features, means, or instructions for identifying that an error in receiving a prior BPL indication has occurred based at least in part on determining that the scheduling offset is less than the threshold value, and the BPL indicated differs from the BPL for data at the second time. Some examples of the method, apparatus, and non-transitory computer-readable medium described above may further include processes, features, means, or instructions for correcting, after the identifying the error in receiving the prior BPL indication, the BPL for data as maintained by the UE and using the corrected BPL for data after the first time plus the threshold value if it is not overwritten by any other signaled switch of the BPL for data occurring between the second time and the first time plus threshold value.

In some examples of the method, apparatus, and non-transitory computer-readable medium described above, the determining comprises determining to switch the BPL for data to the second BPL, based at least in part on determining that the scheduling offset may be less than the threshold value, effective starting at the first time plus the threshold value. In some examples of the method, apparatus, and non-transitory computer-readable medium described above, the determining comprises determining to switch the BPL for data to the second BPL at the first time plus the threshold value irrespective of the scheduling offset. In some examples of the method, apparatus, and non-transitory computer-readable medium described above, the data TTIs include uplink data TTIs, downlink data TTIs, or combinations thereof.

A method of wireless communication is described. The method may include establishing, at a base station, a first connection with a user equipment (UE) using a first beam pair link (BPL), maintaining a BPL for data, which is initialized with the first BPL and is used during data transmission time intervals (TTIs), changing the BPL for data to a second BPL based at least on one or more channel conditions, identifying a threshold value corresponding to an amount of time for the UE to decode an indication of a BPL switch and apply a different BPL based at least in part on the indication, allocating resources for the UE for a first data TTI, determining a scheduling offset between a control information transmission indicating the allocated resources and a start of the first data TTI, and transmitting control information to the UE, the control information including the scheduling offset, an assignment for the first data TTI, and a BPL indication, and wherein the scheduling offset, a time of the control information transmission, the threshold value, and the BPL indication indicates to the UE whether the BPL for data will change and a BPL change time.

An apparatus for wireless communication is described. The apparatus may include means for establishing, at a base station, a first connection with a user equipment (UE) using a first beam pair link (BPL), means for maintaining a BPL for data, which is initialized with the first BPL and is used during data transmission time intervals (TTIs), means for changing the BPL for data to a second BPL based at least on one or more channel conditions, means for identifying a threshold value corresponding to an amount of time for the UE to decode an indication of a BPL switch and apply a different BPL based at least in part on the indication, means for allocating resources for the UE for a first data TTI, means for determining a scheduling offset between a control information transmission indicating the allocated resources and a start of the first data TTI, and means for transmitting control information to the UE, the control information including the scheduling offset, an assignment for the first data TTI, and a BPL indication, and wherein the scheduling offset, a time of the control information transmission, the threshold value, and the BPL indication indicates to the UE whether the BPL for data will change and a BPL change time.

Another apparatus for wireless communication is described. The apparatus may include a processor, memory in electronic communication with the processor, and instructions stored in the memory. The instructions may be operable to cause the processor to establish, at a base station, a first connection with a user equipment (UE) using a first beam pair link (BPL), maintain a BPL for data, which is initialized with the first BPL and is used during data transmission time intervals (TTIs), change the BPL for data to a second BPL based at least on one or more channel conditions, identify a threshold value corresponding to an amount of time for the UE to decode an indication of a BPL switch and apply a different BPL based at least in part on the indication, allocate resources for the UE for a first data TTI, determine a scheduling offset between a control information transmission indicating the allocated resources and a start of the first data TTI, and transmit control information to the UE, the control information including the scheduling offset, an assignment for the first data TTI, and a BPL indication, and wherein the scheduling offset, a time of the control information transmission, the threshold value, and the BPL indication indicates to the UE whether the BPL for data will change and a BPL change time.

A non-transitory computer-readable medium for wireless communication is described. The non-transitory computer-readable medium may include instructions operable to cause a processor to establish, at a base station, a first connection with a user equipment (UE) using a first beam pair link (BPL), maintain a BPL for data, which is initialized with the first BPL and is used during data transmission time intervals (TTIs), change the BPL for data to a second BPL based at least on one or more channel conditions, identify a threshold value corresponding to an amount of time for the UE to decode an indication of a BPL switch and apply a different BPL based at least in part on the indication, allocate resources for the UE for a first data TTI, determine a scheduling offset between a control information transmission indicating the allocated resources and a start of the first data TTI, and transmit control information to the UE, the control information including the scheduling offset, an assignment for the first data TTI, and a BPL indication, and wherein the scheduling offset, a time of the control information transmission, the threshold value, and the BPL indication indicates to the UE whether the BPL for data will change and a BPL change time.

In some examples of the method, apparatus, and non-transitory computer-readable medium described above, a change of the BPL for data for the first data TTI may be indicated by the scheduling offset being greater than or equal to the threshold value. Some examples of the method, apparatus, and non-transitory computer-readable medium described above may further include processes, features, means, or instructions for determining not to convey a change of the BPL for data when the scheduling offset may be less than the threshold value.

Some examples of the method, apparatus, and non-transitory computer-readable medium described above, when the scheduling offset may be less than the threshold value, the BPL indicated in the control information indicates the BPL used for the first data TTI. In some examples of the method, apparatus, and non-transitory computer-readable medium described above, a change of the BPL for data may be indicated by the scheduling offset being less than the threshold value, and the BPL change time corresponds to the time of the control information transmission plus the threshold value.

In some examples of the method, apparatus, and non-transitory computer-readable medium described above, a change of the BPL for data may be indicated irrespective of the scheduling offset, and the BPL change time corresponds to the time of the control information transmission plus the threshold value. In some examples of the method, apparatus, and non-transitory computer-readable medium described above, the data TTIs include uplink data TTIs, downlink data TTIs, or combinations thereof.

DETAILED DESCRIPTION

Figure 1:
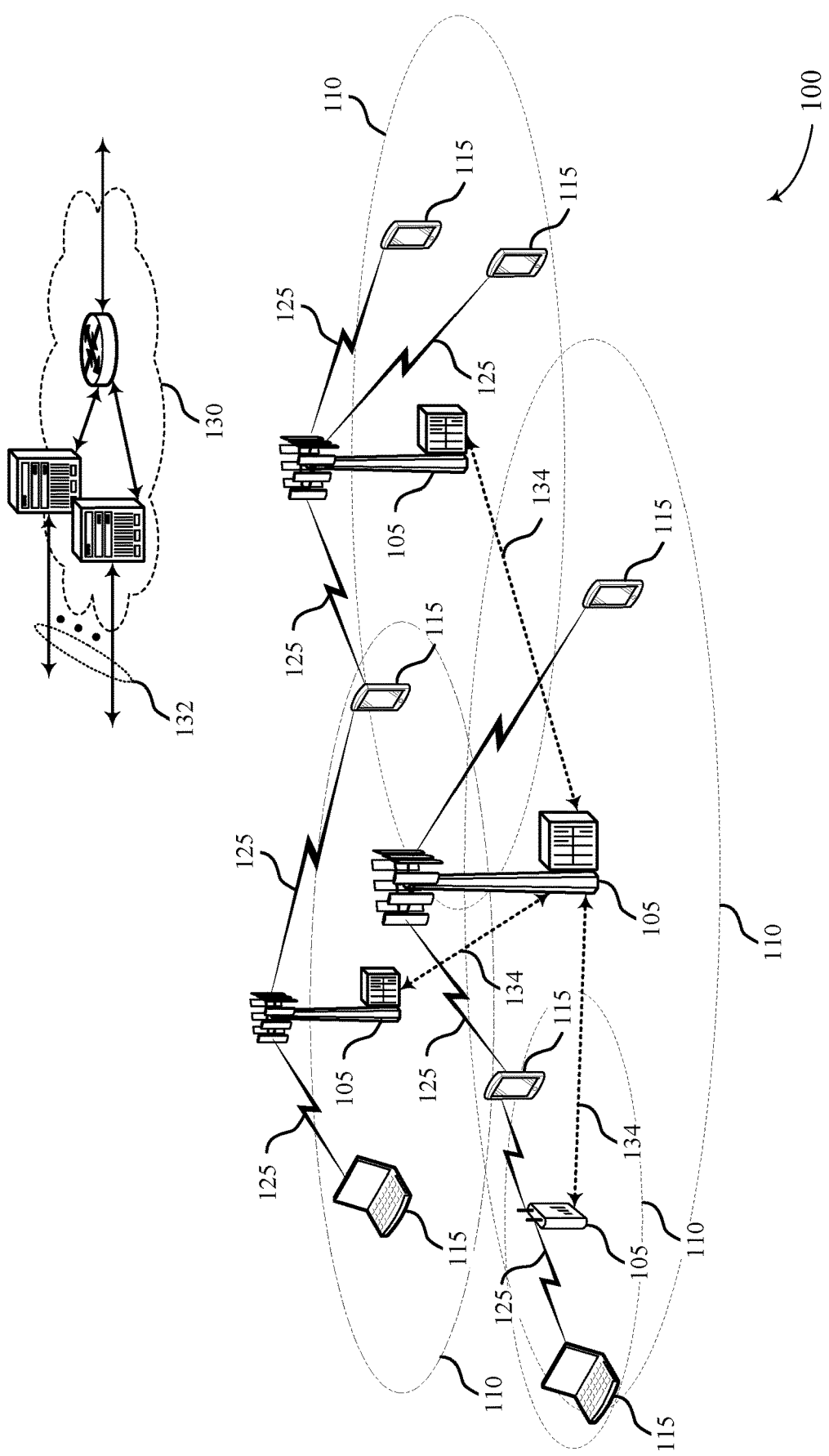
FIG. 1 illustrates an example of a system for wireless communication that supports methods for beam determination after beam pair link indication in accordance with aspects of the present disclosure.

Various described techniques provide for signaling and switching of beam pair links (BPLs) for directional transmission beams between a base station and a user equipment (UE). In some cases, a threshold value may be determined, which corresponds to an amount of time for a UE to receive and decode control information, and apply a different BPL than a current BPL that is in use. In some cases, the UE may maintain a BPL for data, which is used during data TTIs until an indication is received to change the BPL for data. In some cases, the UE and the base station may determine to change between BPLs based at least in part on the threshold value and a scheduling offset between a control channel transmission that allocates resources for a data transmission time interval (TTI) and a start of the data TTI.

As indicated above, in mmW systems a base station and UE may communicate via one or more directional beams, and a base station may engage in a beam sweeping operation to establish an active transmit beam with a UE. A base station may also engage in beam tracking to maintain a connection with a UE. In some cases, the base station, as part of the beam sweep procedure, may perform a sector sweep with wide-formed, lower gain beams to establish a primary connection. Then, the base station may perform beam refinement using narrower, higher gain beams, and the UE and base station may identify one or more BPLs that are suitable for subsequent communications. Once the BPLs are identified, the base station may signal to the UE which BPL is to be used for data TTIs, which may include uplink data TTIs in which data is transmitted from the UE to the base station, downlink TTIs in which data is transmitted from the base station to the UE, or combinations thereof. The base station in some cases may perform a continuous beam tracking process to identify a preferred BPL for communications with the UE. For example, a first BPL may be the BPL for data, and the base station may determine that a second BPL has better channel conditions and should be used in subsequent transmissions (e.g., due to signal fading or blockage of the first BPL).

In order to switch between BPLs, various techniques such as described herein provide for dynamic switching of BPLs. For dynamic switching purposes, the BPL may be conveyed to the UE in the same control information message (e.g., downlink control information (DCI)) that contains the scheduling assignment of a data TTI (e.g., a physical downlink shared channel (PDSCH) transmission). For example, the DCI may contain a BPL indication (which may also be referred to as a spatial quasi colocation (QCL) indication), details of the TTI, and a scheduling offset. The scheduling offset indicates the time between the symbol that contains the DCI and the start of the associated data TTI. However, as indicated above, the UE may need a certain period of time to receive and decode an indication of a BPL switch and to perform the BPL switch, and such a time period is referred to herein as a threshold value. In the event that the base station determines to switch BPLs, the scheduling offset to indicate such a change that is implemented at the UE for a data TTI needs to be greater than or equal to the threshold value. Various aspects of the present disclosure provide techniques for indicating BPLs for data to a UE, and UE actions based on received indications of BPLs. Such techniques may provide for relatively fast switching between BPLs, and may also provide opportunities for UEs to identify if an error in one or more BPL indications has occurred. Such techniques may improve network efficiency through transmissions using favorable BPLs, which may support higher data rates, lower error rates, or combinations thereof.

Aspects of the disclosure are initially described in the context of a wireless communications system. Various examples of timings for indications of BPLs for data and associated data TTIs, and process flows are then described. Aspects of the disclosure are further illustrated by and described with reference to apparatus diagrams, system diagrams, and flowcharts that relate to methods for beam determination after beam pair link indication.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network (also referred to as a 4G network), or a New Radio (NR) network (also referred to as a 5G network). In some cases, wireless communications system 100 may support enhanced broadband communications, ultra-reliable (i.e., mission critical) communications, low latency communications, and communications with low-cost and low-complexity devices. Wireless communications system 100 may support mmW transmissions and beam switching techniques for switching BPLs, as discussed herein.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). In such cases, a first UE 115 may be a transmitter and another UE 115 may be a receiver. One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, such as in the range of 300 MHz to 300 GHz. In some cases, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may use mmW communications between UEs 115 and base stations 105, which may use beamforming techniques for transmitting and receiving transmissions. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both. In some cases, mmW transmissions may use an unlicensed high frequency band and a separate anchor carrier may be established in a lower band.

As indicated above, some signals (e.g. synchronization signals, reference signals, beam selection signals, or other control signals) may be transmitted by a base station 105 multiple times in different directions in a beam sweep operation, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

As indicated above, in some cases communications between a UE 115 and a base station 105 may be established using a first BPL having an associated uplink transmission beam and downlink transmission beam. The base station 105, the UE 115, or both, may periodically measure one or more channel conditions and may determine whether the first BPL, or a different second BPL, may be more suitable for subsequent transmissions. Upon determining that the second BPL should be used for subsequent transmissions at the base station 105 (e.g., through channel measurements or receiving signaling from the UE 115 with channel measurements), the second BPL may be indicated to the UE 115 in a control information transmission (e.g., a DCI transmission using a PDCCH). Depending upon the scheduling offset and the threshold value for receiving control information and changing BPLs at the UE 115, the UE 115 may receive the control information and determine whether the BPL is to be changed. Such techniques may improve network efficiency through transmissions using favorable BPLs, which may support higher data rates, lower error rates, or combinations thereof.

Figure 2:
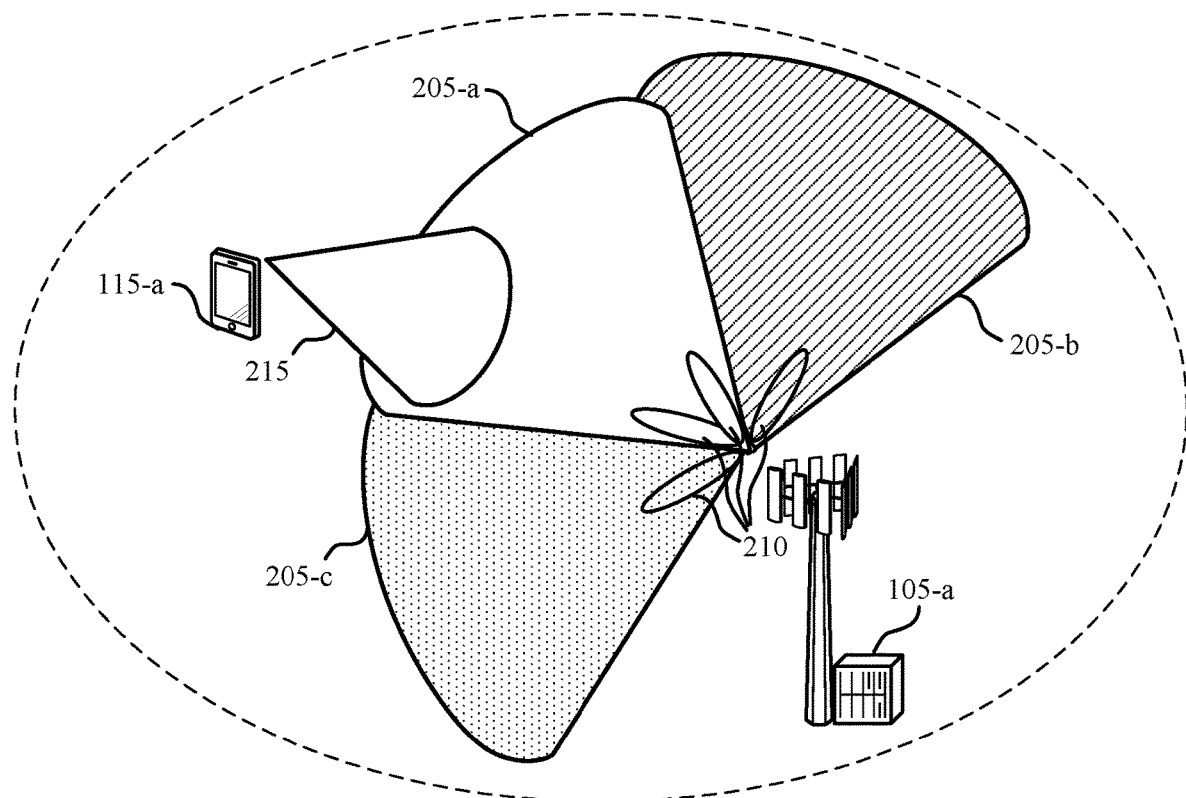
FIG. 2 illustrates an example of a wireless communication subsystem that supports methods for beam determination after beam pair link indication in accordance with aspects of the present disclosure.

FIG. 2 illustrates an example of a wireless communication subsystem 200 that supports methods for beam determination after beam pair link indication in accordance with various aspects of the present disclosure. Wireless communication subsystem 200 may include a base station 105-a and a UE 115-a, which may be examples of the corresponding devices described with reference to FIG. 1. Base station 105-a and UE 115-a may communicate using one or more directional beams. In wireless communication system 200, a transmitter (e.g., base station 105-a) may engage in a beam sweeping operation to establish an active BPL with a receiver (e.g., UE 115-a).

In some examples, the beam sweeping operation and any associated beam refinement procedures to establish an active BPL between UE 115-a and the base station 105-a may identify a number of suitable BPLs that may be used for mmW communications. In some examples, base station 105-a may use a first port to transmit relatively wide-formed beams 205 (e.g., analog beams), that may be transmitted towards different sectors or geographic directions. In the example of FIG. 2, a first wide-formed beam 205-a may be transmitted in a first direction, a second wide-formed beam 205-b may be transmitted in a second direction, and a third wide-formed beam 205-c may be transmitted in a third direction. In some examples, the gain across a plurality of tones corresponding to wide-formed beams 205 may be close to equal.

In some cases, wide-formed beams 205 may not be narrow enough or have a high enough gain to be a preferred directional transmit beam for use in a BPL. Transmissions from UE 115-a may be more clearly received and decoded if received via a highly directional and refined transmit beam. Therefore, it may be beneficial for base station 105-a to use beam refinement to generate narrower beamformed signals of refined beams 210, which may have a narrower coverage area but higher gain. UE 115-a may identify which of the refined beams 210 is received at the highest gain, and may indicate one or more such beams to the base station 105-a which may be used to identify one or more BPLs that are suitable for communications between the UE 115-a and the base station 105-a. In some cases, the base station 105-a may perform similar measurements on beams 215 transmitted from the UE 115-a in order to determine one or more BPLs that are suitable for communications.

In some cases, the base station 105-a and the UE 115-a may operate in a non-standalone configuration, in which mmW communications have an associated low-band carrier or anchor carrier. In some cases, some or all control information may be transmitted between the UE 115-a and the base station 105-a using such a low-band carrier, and data TTIs may refer to TTIs that are used to transmit data using high-band mmW BPLs. In some cases, as will be discussed in more detail below, the base station 105-a may provide indications in control information, such as in DCI transmissions to the UE 115-a, of a BPL and a scheduling offset for a data TTI, and the BPL indication indicates to the UE 115-a whether the BPL for a data TTI will change, a BPL change time, and the associated BPL. In other cases, a standalone configuration may be used in which all control and data transmissions are transmitted using high-band mmW carriers.

Figure 3:
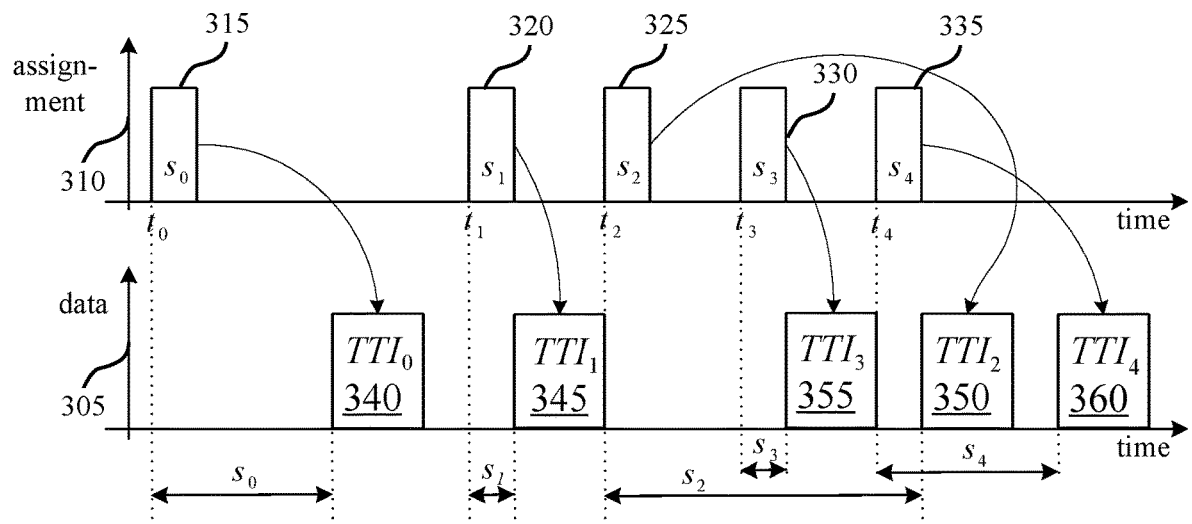
FIGS. 3 through 8 illustrate examples of timings between control information transmissions and associated data TTIs that support methods for beam determination after beam pair link indication in accordance with aspects of the present disclosure.

FIG. 3 illustrates an example of timings between control information transmissions and associated data TTIs 300 that supports methods for beam determination after beam pair link indication in accordance with various aspects of the present disclosure. In some examples, timings between control information transmissions and associated data TTIs 300 may be used to implement aspects of wireless communication system 100.

In the example of FIG. 3, a base station (e.g., a base station 105 of FIG. 1 or 2) may transmit scheduling assignments 310 or resource allocations for corresponding data TTIs 305. In some cases, the scheduling assignments 310 may be transmitted on a control channel (e.g., a PDCCH) in DCI. In some cases, the scheduling assignments 310 may be transmitted using a low-band anchor carrier and the data TTIs 305 may use high-band mmW carriers. In other cases scheduling assignments 310 and the data TTIs 305 may both use high-band mmW carriers. The data TTIs 305 may be uplink TTIs, downlink TTIs, or combinations thereof, that may include physical downlink shared channel (PDSCH) or physical uplink shared channel (PUSCH) transmissions in which data may be transmitted.

In some examples, the DCI may contain the BPL indication (also referred to as a spatial quasi colocation (QCL) indication), details of the TTI (e.g., uplink or downlink resources, etc.), and a scheduling offset ($s_i$). The scheduling offset indicates, in some cases, the time between the symbol that contains the DCI and the start of the associated data TTI. In the example of FIG. 3, a first scheduling assignment 315 may include an assignment for a first data TTI 340 ($TTI_0$) and may indicate a first scheduling offset so corresponding to a time difference between the start time to of the first scheduling assignment 315 and the start time of the first data TTI 340. In this example, a second scheduling assignment 320 may include an assignment for a second data TTI 345 ($TTI_1$) and may indicate a second scheduling offset $s_1$ corresponding to a time difference between the start time $t_1$ of the second scheduling assignment 320 and the start time of the second data TTI 345, with similar scheduling assignments for a third scheduling assignment 325, fourth scheduling assignment 330, and fifth scheduling assignment 335 that schedule corresponding third data TTI 350 ($TTI_2$), fourth data TTI 355 ($TTI_3$), and fifth data TTI 360 ($TTI_4$).

As indicated in the example of FIG. 3 the scheduling offsets can be vary in length and therefore the order of the TTIs does not have to match the order of the associated DCIs with the scheduling assignments. In the example of FIG. 3, for example, the third data TTI 350 ($TTI_2$) is preceded by fourth data TTI 355 (TTI$_3$). As discussed, scheduling assignments 310 may include a BPL or QCL indication, referred to as b$_i$, and a UE (e.g., a UE 115 of FIG. 1 or 2) may use a beam compatible with b$_i$ during the associated data TTI$_i$. However, as indicated above, a UE may require some time to decode a DCI and scheduling assignment, extract the BPL or QCL indication, and prepare the associated beam to be ready when data TTI$_i$ starts. In some cases, a threshold value, referred to as time K, may be an upper bound to the time the UE requires to decode a DCI and prepare a beam corresponding to the indicated BPL. In some cases, both the base station and the UE may be aware of the threshold value K, and various beam scheduling rules may be implemented that depend on K. In some cases, the threshold value K may either be part of the air-link specification or can be established after the UE or several UEs have signaled to the base station their individual threshold values K between DCI receipt and beam readiness. The base station may use one value of K for each individual UE or one value K for a group of UEs, or one value K for all UEs.

In cases where the scheduling offset s$_i$ is larger or equal to K, the UE has enough time to prepare a beam compatible with b$_i$, and in the remaining case s$_i$<K this is not possible. Various aspects of the present disclosure provide techniques for determining a BPL to use for a TTI based on the value of K, the scheduling offset, and the BPL or QCL indicated in the scheduling assignment, that may provide a scheduler at a base station with relatively high flexibility with relatively small scheduling offsets. Such techniques may enable the base station to provide low latency for certain packets.

Figure 4:
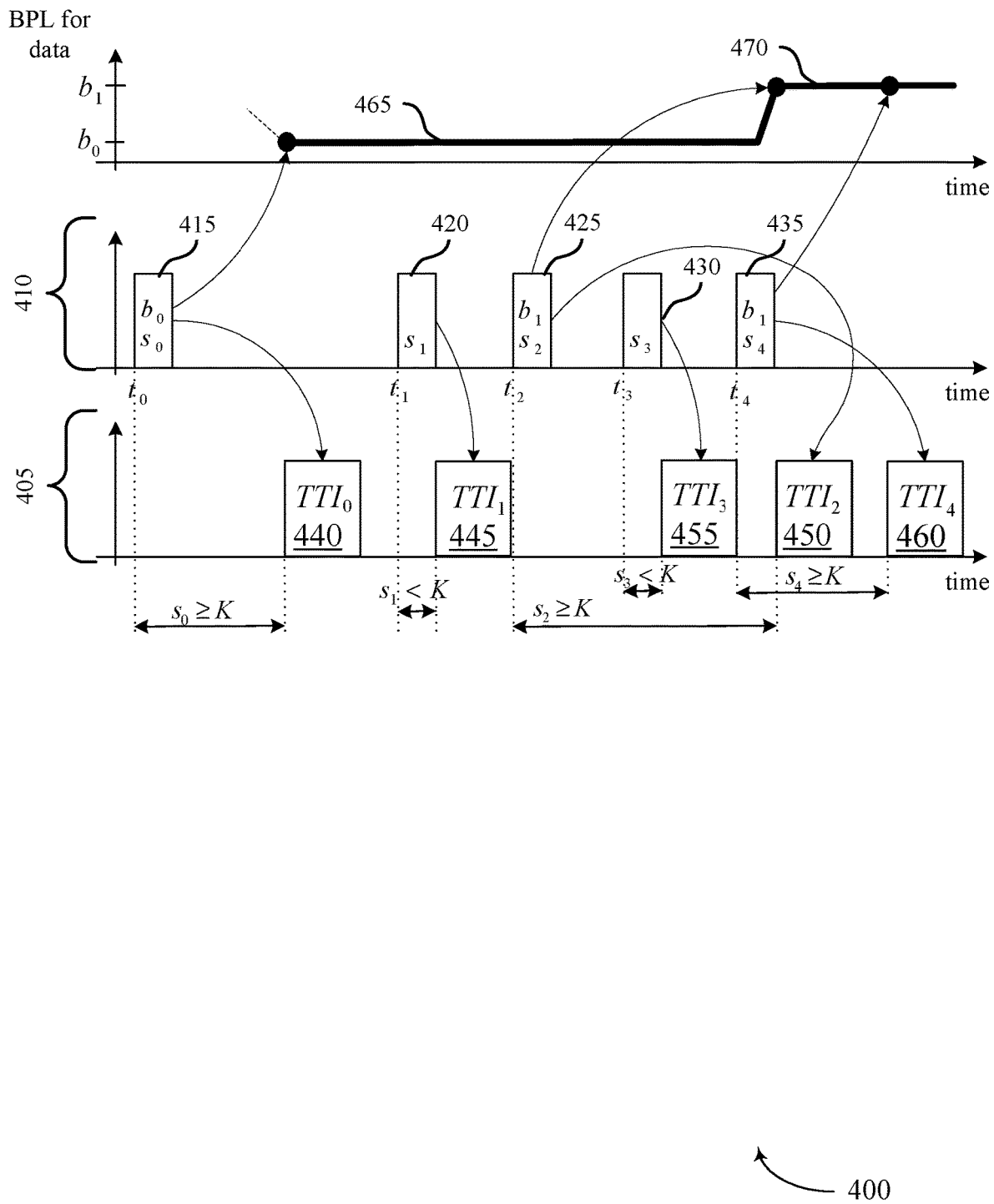

FIG. 4 illustrates another example of timings between control information transmissions and associated data TTIs as well as associated BPLs 400 that support methods for beam determination after beam pair link indication in accordance with various aspects of the present disclosure. In some examples, timings between control information transmissions and associated data TTIs as well as associated BPLs 400 may implement aspects of wireless communication system 100.

In the example of FIG. 4, similarly as discussed with respect to FIG. 3, a base station (e.g., a base station 105 of FIG. 1 or 2) may transmit scheduling assignments 410 or resource allocations for corresponding data TTIs 405. Scheduling assignments 410 may be transmitted on a control channel (e.g., a PDCCH) in DCI, as discussed above. In some cases, the scheduling assignments 410 may be transmitted using a low-band anchor carrier and the data TTIs 405 may use high-band mmW carriers. In other cases scheduling assignments 410 and the data TTIs may both use high-band mmW carriers. The data TTIs 405 may be uplink TTIs, downlink TTIs, or combinations thereof, that may include physical downlink shared channel (PDSCH) or physical uplink shared channel (PUSCH) transmissions in which data may be transmitted.

As indicated above, the DCI may contain the BPL indication (also referred to as a spatial quasi colocation (QCL) indication), details of the TTI (e.g., uplink or downlink resources, etc.), and a scheduling offset (s$_i$). In this example, some of the scheduling assignments 410 may include a BPL indication b$_i$ (or QCL indication). The scheduling offset indicates, in some cases, the time between the symbol that contains the DCI and the start of the associated data TTI. In the example of FIG. 4, similarly as discussed in FIG. 3, a first scheduling assignment 415 may include an assignment for a first data TTI 440 (TTI$_0$) and may indicate a first scheduling offset s$_0$ corresponding to a time difference between the start time t$_0$ of the first scheduling assignment 415 and the start time of the first data TTI 440. In this example, a second scheduling assignment 420 may include an assignment for a second data TTI 445 (TTI$_1$) and may indicate a second scheduling offset s$_1$ corresponding to a time difference between the start time t$_1$ of the second scheduling assignment 420 and the start time of the second data TTI 445, with similar scheduling assignments for a third scheduling assignment 425, fourth scheduling assignment 430, and fifth scheduling assignment 435 that schedule corresponding third data TTI 450 (TTI$_2$), fourth data TTI 455 (TTI$_3$), and fifth data TTI 460 (TTI$_4$).

In the example of FIG. 4, the base station may use relatively large scheduling offsets to signal BPL changes to the UE. In this example, TTIs between BPL changes can be scheduled with small scheduling offsets and a rule may be established that states that those TTIs scheduled with small offsets use the same BPL as the most recent TTI scheduled with a large offset. In the example of FIG. 4, a BPL change may be indicated at the start of TTI$_0$ 440 to change from a prior BPL to b$_0$, and another change at the start of TTI$_2$ 450 to change from b$_0$ to b$_1$. In this case, the intermediate TTIs (namely TTI$_1$ 445 and TTI$_3$ 455) are scheduled with small offsets, and data TTIs with such small offsets (e.g., a scheduling offset of s$_i$<K) may be transmitted by the base station using the same BPL as the most recent data TTI, and the UE may assume the same BPL as the most recent TTI scheduled with a large offset is used. In such a case, in the example of FIG. 4, the first TTI 440 (TTI$_0$) may be transmitted using a first BPL 465 (i.e., b$_0$), and the second TTI 445 (TTI$_1$) and fourth TTI (TTI$_3$) may have scheduling offsets (s$_1$ and s$_3$) that are less than K, and in this example the first BPL 465 is used for each. The third data TTI 450 (TTI$_2$), which in this example is after the fourth TTI 455 due to the associated scheduling offset, may switch to a second BPL 470.

In cases as discussed with respect to FIG. 4, if BPL indications of scheduling assignments 410 are provided when the scheduling offset is less than the threshold value, a UE may ignore the BPL indication. In some cases, however, if a UE misses a scheduling assignment 410 that indicates a changed BPL, then the UE may apply the wrong beam for subsequent data TTIs. In case of FIG. 4, if the UE fails to receive and decode the first scheduling assignment 415, then TTI$_0$ 440, TTI$_1$445, and TTI$_3$ 455 would be lost. In some cases, as will be discussed with respect to FIG. 5, a UE may verify a BPL indication in scheduling assignments 410 that have a scheduling offset that is less than the threshold value.

Figure 5:
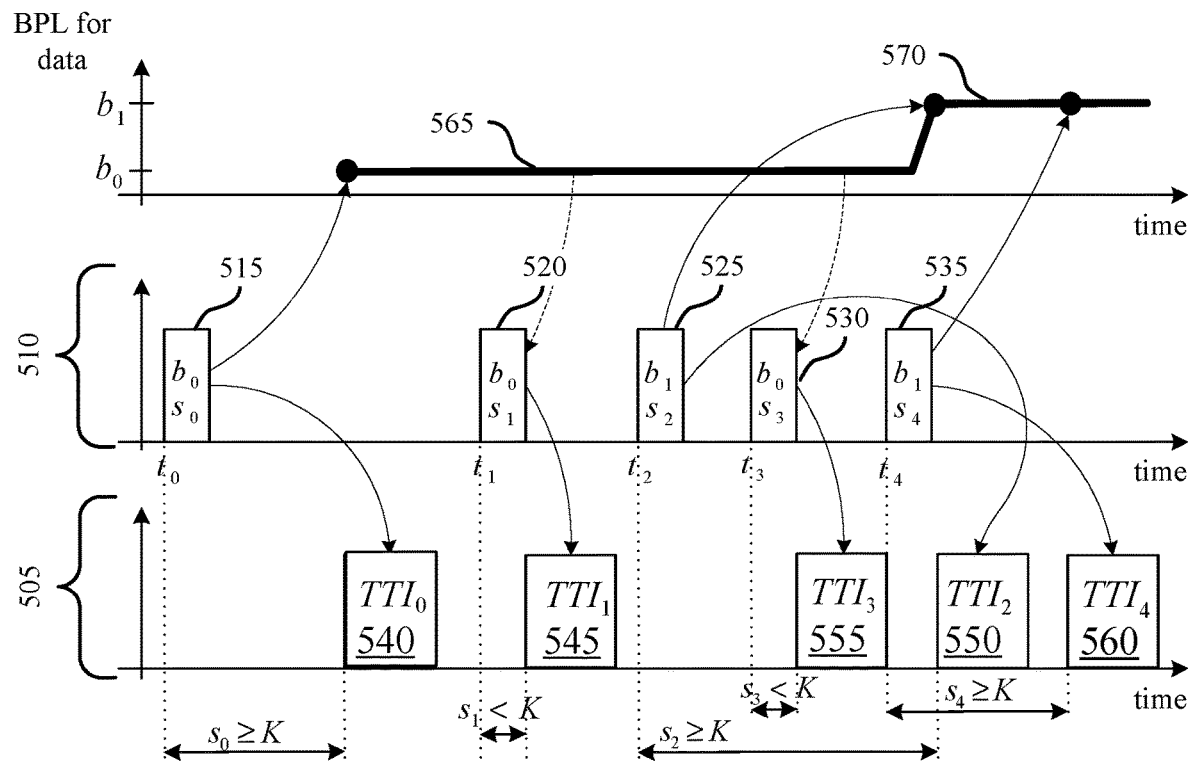

FIG. 5 illustrates another example of timings between control information transmissions and associated data TTIs as well as associated BPLs 500 that supports methods for beam determination after beam pair link indication in accordance with various aspects of the present disclosure. In some examples, control information transmissions and associated data TTIs as well as associated BPLs 500 may implement aspects of wireless communication system 100.

In the example of FIG. 5, similarly as discussed with respect to FIGS. 3 and 4, a base station (e.g., a base station 105 of FIG. 1 or 2) may transmit scheduling assignments 510 or resource allocations for corresponding data TTIs 505. Scheduling assignments 510 may be transmitted on a control channel (e.g., a PDCCH) in DCI, as discussed above. In some cases, the scheduling assignments 510 may be transmitted using a low-band anchor carrier and the data TTIs 505 may use high-band mmW carriers. In other cases scheduling assignments 510 and the data TTIs may both use high-band mmW carriers. The data TTIs 505 may be uplink TTIs, downlink TTIs, or combinations thereof, that may include physical downlink shared channel (PDSCH) or physical uplink shared channel (PUSCH) transmissions in which data may be transmitted.

As indicated above, the DCI may contain the BPL indication (also referred to as a spatial quasi colocation (QCL) indication), details of the TTI (e.g., uplink or downlink resources, etc.), and a scheduling offset ($s_i$). In this example, each of the scheduling assignments 510 also include a BPL indication $b_i$ (or QCL indication). The scheduling offset indicates, in some cases, the time between the symbol that contains the DCI and the start of the associated data TTI. In the example of FIG. 5, similarly as discussed in FIGS. 3 and 4, a first scheduling assignment 515 may include an assignment for a first data TTI 540 ($TTI_0$) and may indicate a first scheduling offset so corresponding to a time difference between the start time to of the first scheduling assignment 515 and the start time of the first data TTI 540. In this example, a second scheduling assignment 520 may include an assignment for a second data TTI 545 ($TTI_1$) and may indicate a second scheduling offset $s_1$ corresponding to a time difference between the start time $t_1$ of the second scheduling assignment 520 and the start time of the second data TTI 545, with similar scheduling assignments for a third scheduling assignment 525, fourth scheduling assignment 530, and fifth scheduling assignment 535 that schedule corresponding third data TTI 550 ($TTI_2$), fourth data TTI 555 ($TTI_3$), and fifth data TTI 560 ($TTI_4$).

In the example of FIG. 5, in order to limit potential error propagation that may result from a missed scheduling assignment, the base station may provide a BPL indication $b_i$ for scheduling assignments 410 even in cases where the scheduling offset is less than the threshold value. The UE can use this information to verify that it has used or is about to use the correct beam for the scheduled TTI. If not, the UE may take corrective action and apply the beam compatible with $b_i$ for a TTI that starts at $t_i+K$, where $t_i$ is the start of the symbol that carries the scheduling assignment DCI. In the example of FIG. 5, the second scheduling assignment 520 and the fourth scheduling assignment 530 may carry a BPL indication of $b_0$ to indicate to the UE that BPL $b_0$ 565 is used for the associated TTIs. Likewise after a switch to a second BPL $b_1$ 570, if any scheduling assignments are provided in which the scheduling offset is less than the threshold value, the base station may indicate $b_1$ in such scheduling assignments, which the UE may use to confirm the BPL.

Likewise, if the UE does not successfully receive and decode the first scheduling assignment 515, it will miss $TTI_0$ 540 and apply the wrong beam for $TTI_1$ 545. In this example, the second scheduling assignment 520 contains the QCL indication $b_0$ and the UE will likely decode this information (e.g., via a low-band anchor carrier) while it is receiving/transmitting $TTI_1$ 545. At that time, the UE may realize that the wrong BPL is being used due to a missed DCI. As a corrective action the UE may, for example, prepare a beam compatible with the BPL $b_0$ 565 which can be ready for use after time $t_1+K$, well ahead of $TTI_3$ 555, and the UE will receive/transmit $TTI_3$ 555 using the correct BPL. Similarly, if the UE were to miss third scheduling assignment 525, a correction could be made to the BPL upon receipt of a subsequent scheduling assignment irrespective of whether the associated scheduling offset is less than or greater than the threshold value K.

Figure 6:
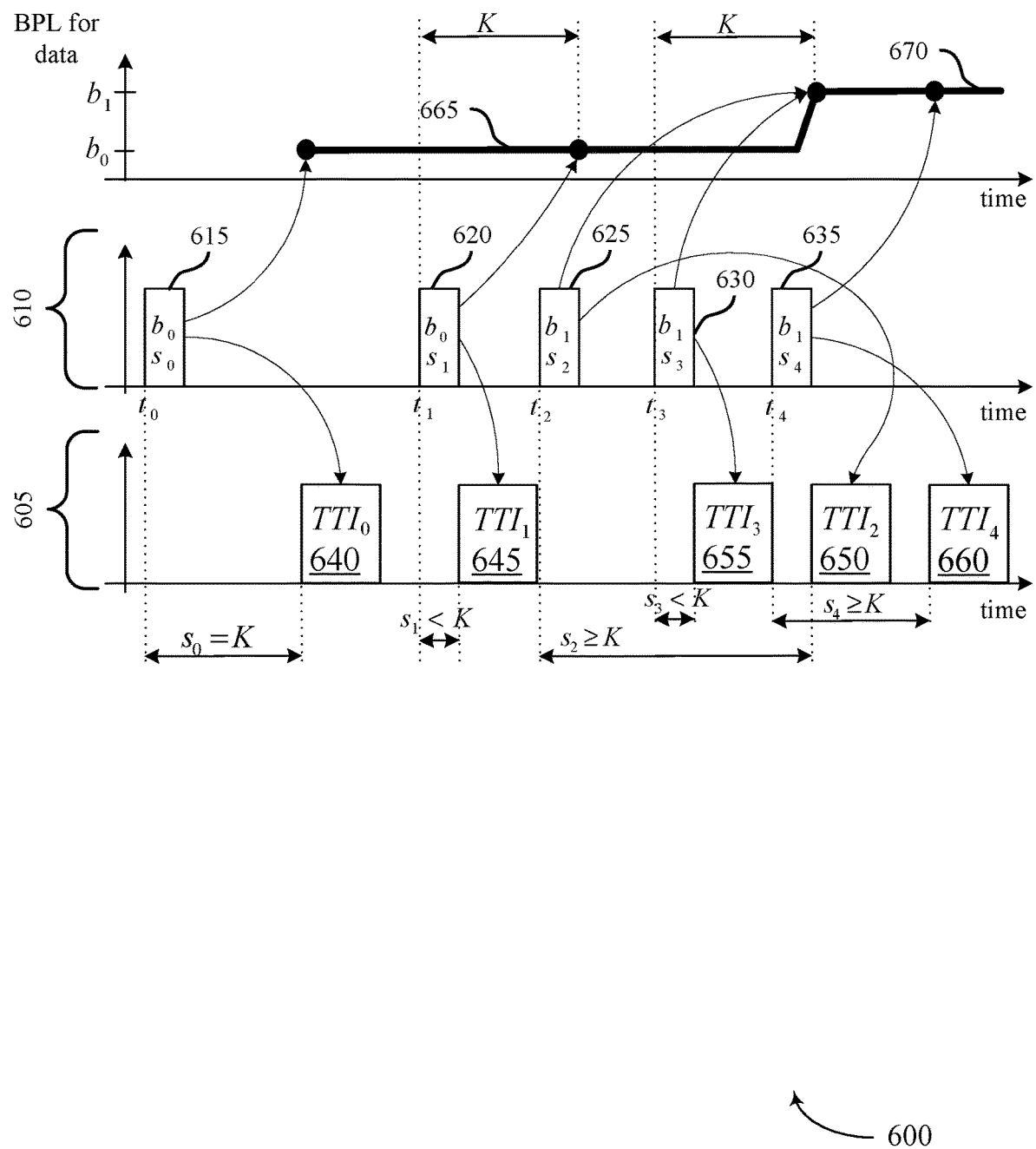

FIG. 6 illustrates another example of timings between control information transmissions and associated data TTIs as well as associated BPLs 600 that supports methods for beam determination after beam pair link indication in accordance with various aspects of the present disclosure. In some examples, control information transmissions and associated data TTIs as well as associated BPLs 600 may implement aspects of wireless communication system 100.

In the example of FIG. 6, similarly as discussed with respect to FIGS. 3 through 5, a base station (e.g., a base station 105 of FIG. 1 or 2) may transmit scheduling assignments 610 or resource allocations for corresponding data TTIs 605. Scheduling assignments 610 may be transmitted on a control channel (e.g., a PDCCH) in DCI, as discussed above. In some cases, the scheduling assignments 610 may be transmitted using a low-band anchor carrier and the data TTIs 605 may use high-band mmW carriers. In other cases scheduling assignments 610 and the data TTIs may both use high-band mmW carriers. The data TTIs 605 may be uplink TTIs, downlink TTIs, or combinations thereof, that may include physical downlink shared channel (PDSCH) or physical uplink shared channel (PUSCH) transmissions in which data may be transmitted.

As indicated above, the DCI may contain the BPL indication (also referred to as a spatial quasi colocation (QCL) indication), details of the TTI (e.g., uplink or downlink resources, etc.), and a scheduling offset ($s_i$). In this example, each of the scheduling assignments 610 also include a BPL indication $b_i$ (or QCL indication). The scheduling offset indicates, in some cases, the time between the symbol that contains the DCI and the start of the associated data TTI. In the example of FIG. 6, similarly as discussed in FIGS. 3 through 5, a first scheduling assignment 615 may include an assignment for a first data TTI 640 ($TTI_0$) and may indicate a first scheduling offset so corresponding to a time difference between the start time to of the first scheduling assignment 615 and the start time of the first data TTI 640. In this example, a second scheduling assignment 620 may include an assignment for a second data TTI 645 ($TTI_1$) and may indicate a second scheduling offset $s_1$ corresponding to a time difference between the start time $t_1$ of the second scheduling assignment 620 and the start time of the second data TTI 645, with similar scheduling assignments for a third scheduling assignment 625, fourth scheduling assignment 630, and fifth scheduling assignment 635 that schedule corresponding third data TTI 650 ($TTI_2$), fourth data TTI 655 ($TTI_3$), and fifth data TTI 660 ($TTI_4$).

In the example of FIG. 6, another technique is provided which may limit potential error propagation that may result from a missed scheduling assignment. Here, the base station may provide a BPL indication $b_i$ for scheduling assignments 410 in which the indicated BPL is to be effective at a starting time of the symbol used to transmit the scheduling assignment plus the threshold value K. Thus, such a technique provides a rule that for $s_i<K$ the BPL indication $b_i$ will be effective at the time $t_i+K$, where $t_i$ is the start of the symbol that carries the DCI for the scheduling assignment. In such cases, the BPL indication remains effective until it is overwritten by a new BPL indication. In contrast to the technique discussed above with respect to FIG. 5, the BPL indication will be effective independent of any TTI starting between $t_i$ and $t_i+K$. In the example of FIG. 6, in the event that the UE does not successfully receive and decode the first scheduling assignment 615, the UE will use the wrong BPL for $TTI_1$ 645 but will have the correct beam for $TTI_3$ 655, because the starting time for $TTI_3$ is greater than $t_1+K$. In this particular example, both the third scheduling assignment 625 and the fourth scheduling assignment 630 create an effective QCL indication for $TTI_2$ 650 which reduces the probability that the UE uses the wrong BPL for $TTI_2$ 650, since both DCIs need to be lost in order for such an error to occur.

Figure 7:
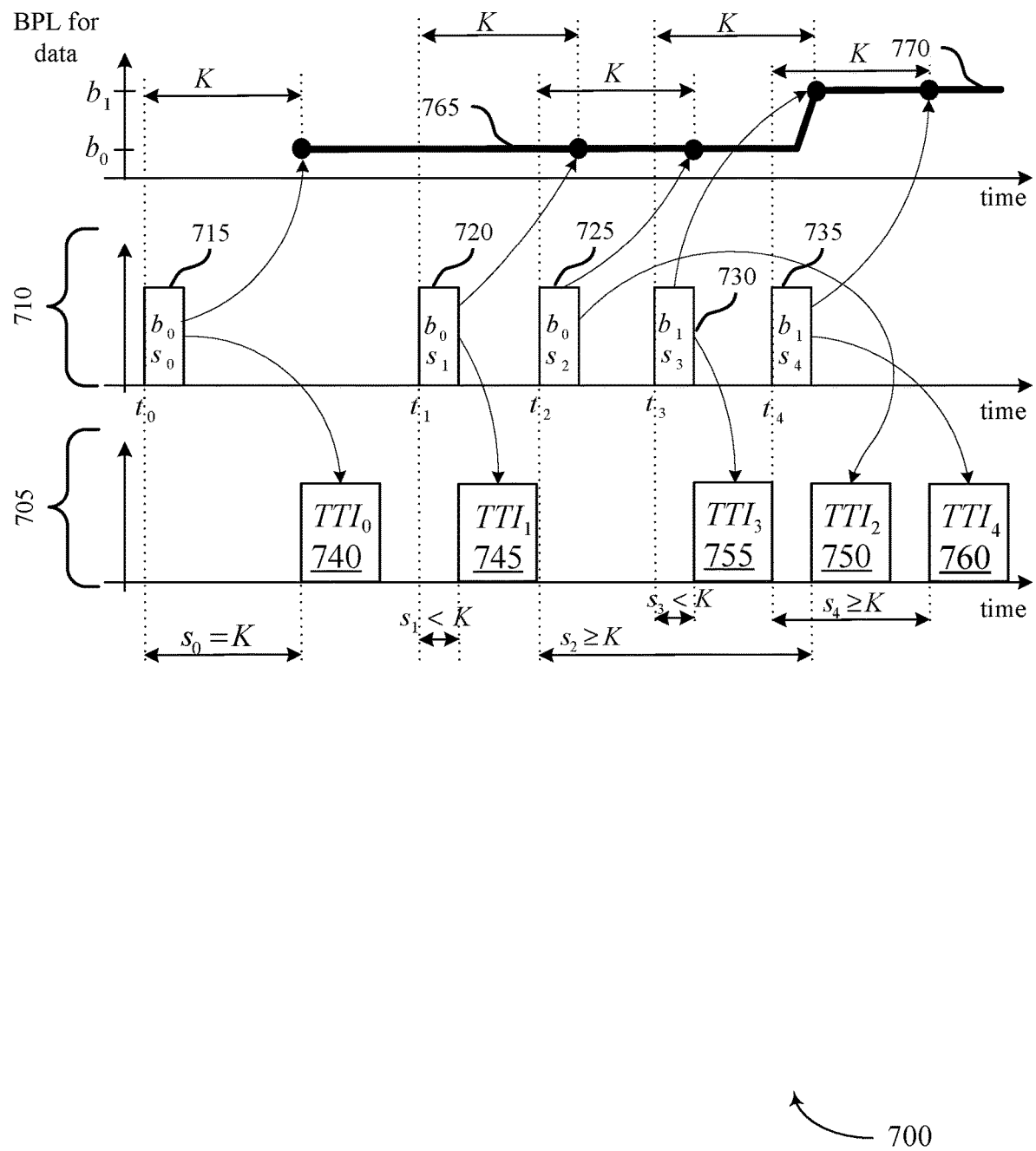

FIG. 7 illustrates another example of timings between control information transmissions and associated data TTIs as well as associated BPLs 700 that supports methods for beam determination after beam pair link indication in accordance with various aspects of the present disclosure. In some examples, control information transmissions and associated data TTIs as well as associated BPLs 700 may implement aspects of wireless communication system 100.

In the example of FIG. 7, similarly as discussed with respect to FIGS. 3 through 6, a base station (e.g., a base station 105 of FIG. 1 or 2) may transmit scheduling assignments 710 or resource allocations for corresponding data TTIs 705. Scheduling assignments 710 may be transmitted on a control channel (e.g., a PDCCH) in DCI, as discussed above. In some cases, the scheduling assignments 710 may be transmitted using a low-band anchor carrier and the data TTIs 705 may use high-band mmW carriers. In other cases scheduling assignments 710 and the data TTIs may both use high-band mmW carriers. The data TTIs 705 may be uplink TTIs, downlink TTIs, or combinations thereof, that may include physical downlink shared channel (PDSCH) or physical uplink shared channel (PUSCH) transmissions in which data may be transmitted.

As indicated above, the DCI may contain the BPL indication (also referred to as a spatial quasi colocation (QCL) indication), details of the TTI (e.g., uplink or downlink resources, etc.), and a scheduling offset ($s_i$). In this example, each of the scheduling assignments 710 also include a BPL indication $b_i$ (or QCL indication). The scheduling offset indicates, in some cases, the time between the symbol that contains the DCI and the start of the associated data TTI. In the example of FIG. 7, similarly as discussed in FIGS. 3 through 6, a first scheduling assignment 715 may include an assignment for a first data TTI 740 ($TTI_0$) and may indicate a first scheduling offset $s_0$ corresponding to a time difference between the start time $t_0$ of the first scheduling assignment 715 and the start time of the first data TTI 740. In this example, a second scheduling assignment 720 may include an assignment for a second data TTI 745 ($TTI_1$) and may indicate a second scheduling offset $s_1$ corresponding to a time difference between the start time $t_1$ of the second scheduling assignment 720 and the start time of the second data TTI 745, with similar scheduling assignments for a third scheduling assignment 725, fourth scheduling assignment 730, and fifth scheduling assignment 735 that schedule corresponding third data TTI 750 ($TTI_2$), fourth data TTI 755 ($TTI_3$), and fifth data TTI 760 ($TTI_4$).

In the example of FIG. 7, another technique is provided which may provide that a BPL is switched relatively quickly after a determination is made to switch BPLs. For example, a base station may detect fading in a first BPL 765 and determine to switch to a second BPL 770. In this example, a rule may be provided that, independent of the scheduling offset, the QCL indication $b_i$ is effective at time $t_i+K$. This also allows a change of the BPL for TTIs that have already been scheduled with a large scheduling offset. For example, the base station may determine at time $t_3$ that the second BPL 770 is better than the first BPL 765. At that point $TTI_2$ 750 is already scheduled with the third scheduling assignment 725 that indicates the first BPL 765. In this case, due to the fourth scheduling assignment 730 being provided the threshold value K in advance of the start of $TTI_2$ 750, the UE will still use a beam compatible with the new BPL indication for the second BPL 770. For this technique, similarly with the techniques described for FIGS. 5 and 6, error propagation due to lost scheduling assignments may be mitigated.

Figure 8:
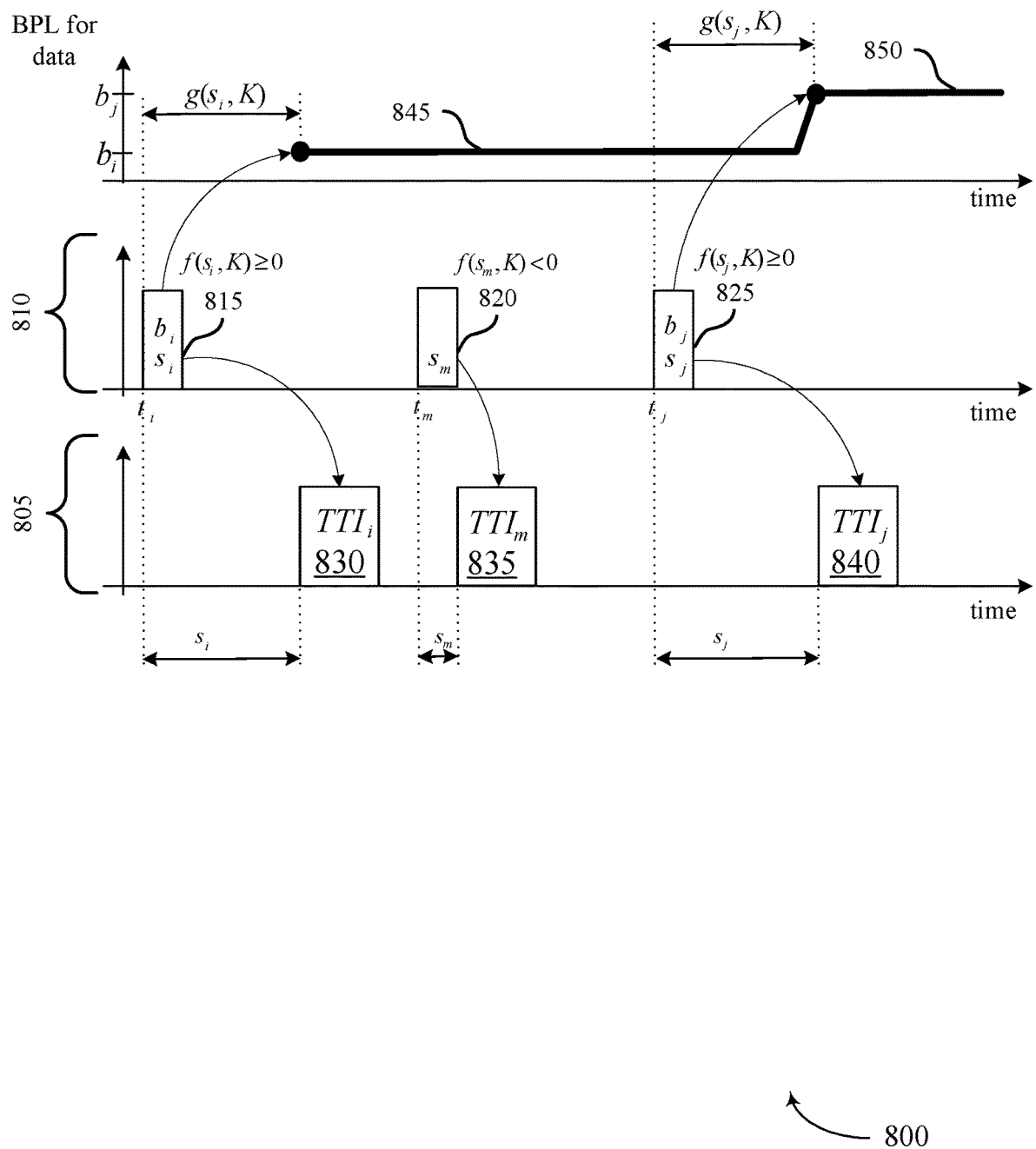

FIG. 8 illustrates another example of timings between control information transmissions and associated data TTIs as well as associated BPLs 800 that supports methods for beam determination after beam pair link indication in accordance with various aspects of the present disclosure. In some examples, control information transmissions and associated data TTIs as well as associated BPLs 800 may implement aspects of wireless communication system 100.

In the example of FIG. 8, similarly as discussed with respect to FIGS. 3 through 7, a base station (e.g., a base station 105 of FIG. 1 or 2) may transmit scheduling assignments 810 or resource allocations for corresponding data TTIs 805. Scheduling assignments 810 may be transmitted on a control channel (e.g., a PDCCH) in DCI, as discussed above. In some cases, the scheduling assignments 810 may be transmitted using a low-band anchor carrier and the data TTIs 805 may use high-band mmW carriers. In other cases scheduling assignments 810 and the data TTIs may both use high-band mmW carriers. The data TTIs 805 may be uplink TTIs, downlink TTIs, or combinations thereof, that may include physical downlink shared channel (PDSCH) or physical uplink shared channel (PUSCH) transmissions in which data may be transmitted.

In the example of FIG. 8, BPLs may be determined based on a function of the scheduling offsets and threshold values according to the various techniques described above. Table 1 shows the BPL indication $b_i$ related interpretations for the different techniques of FIGS. 4 through 7.

TABLE 1

Description of the beam determination.

| Technique | $s_i \geq K$ | $s_i < K$ |
|---|---|---|
| FIG. 4 | $b_i$ is effective | UE ignores $b_i$ |
| FIG. 5 | after $t_i + s_i$ until replaced by a new BPL indication | UE uses $b_i$ for beam verification |
| FIG. 6 | | $b_i$ is effective after $t_i + K$ |
| FIG. 7 | $b_i$ is effective after $t_i + K$ | |

For each technique, a scheduling assignment indicates that a UE is to prepare a beam compatible with the BPL indication either unconditionally, as in the examples of FIGS. 6 and 7, or if a certain condition is met as in the examples of FIGS. 4 and 5. Both situations may be formally covered in a unified manner through a function $f(s_i, K)$. Table 2 shows the function $f$ for the different described techniques.

TABLE 2

Functions f and g related to the disclosed techniques

| Technique | f ($s_i$, K) | g ($s_i$, K) |
|---|---|---|
| FIG. 4 | $s_i - K$ | $s_i$ |
| FIG. 5 | | |
| FIG. 6 | 0 | max ($s_i$, K) |
| FIG. 7 | | K |

In each case, the UE has to prepare beams only, if $f(s_i, K) \geq 0$. If the UE has to prepare a beam, it may apply the beam starting from the time $t_i + g(s_i, K)$ until a time when the UE is instructed by the same mechanism to use a potentially new beam. Table 2 shows the function g for each technique.

In the example of FIG. 8, which may apply to each of the discussed techniques, a scheduling assignment 815 occurring at time $t_i$ may contain a scheduling offset $s_i$ such that $f(s_i, K) \geq 0$. Then the UE prepares a beam compatible with the BPL indication $b_i$ 845 for use of a beam for data starting with time $t_i + g(s_i, K)$. From all scheduling assignments 810 (DCI$_n$) with $$f(s_n, K) \geq 0 \qquad \text{i.}$$

$$t_n + g(s_n, K) \geq t_i + g(s_i, K). \qquad \text{ii.}$$

Further, let DCI$_j$ be the one with the earliest beam start time $t_j + g(s_j, K)$. In other words there is no scheduling assignment DCI with a beam start time that falls between $t_i + g(s_i, K)$ and $t_j + g(s_j, K)$. Then the UE uses the beam compatible with $b_i$ for all TTIs starting within the time interval $[t_i + g(s_i, K), t_j + g(s_j, K)]$.

In the example of FIG. 8, the UE applies the beam compatible with $b_i$ 845 for TTI$_i$ 830 (scheduled by scheduling assignment 815) and also for TTI$_m$ 835 as this is scheduled by a scheduling assignment 820 that does not fulfill the condition $f(s_m, K) \geq 0$. Another example for such a TTI$_m$ 835 could be one with a beam start time of $t_m + g(s_m, K)$ occurring before $t_i + g(s_i, K)$. The BPL $b_j$ 850 may be used after scheduling assignment 825, for TTI 840, in this example.

With respect to scheduling assignment 810 timing, FIG. 8 does not show the full scope of possibilities as will be readily recognized, and it is noted that there can be many or no scheduling assignments between scheduling assignment 815 and scheduling assignment 825. It is also possible that scheduling assignment 825 occurs before scheduling assignment 815. Further $g(s_i, K)$ can be smaller or larger than $s_i$ depending on the desired technique to be employed. However, $g(s_i, K)$, in each case, must always be larger or equal to threshold value K such that the UE has enough time to prepare a beam consistent with the BPL indication of the scheduling assignment.

Figure 9:
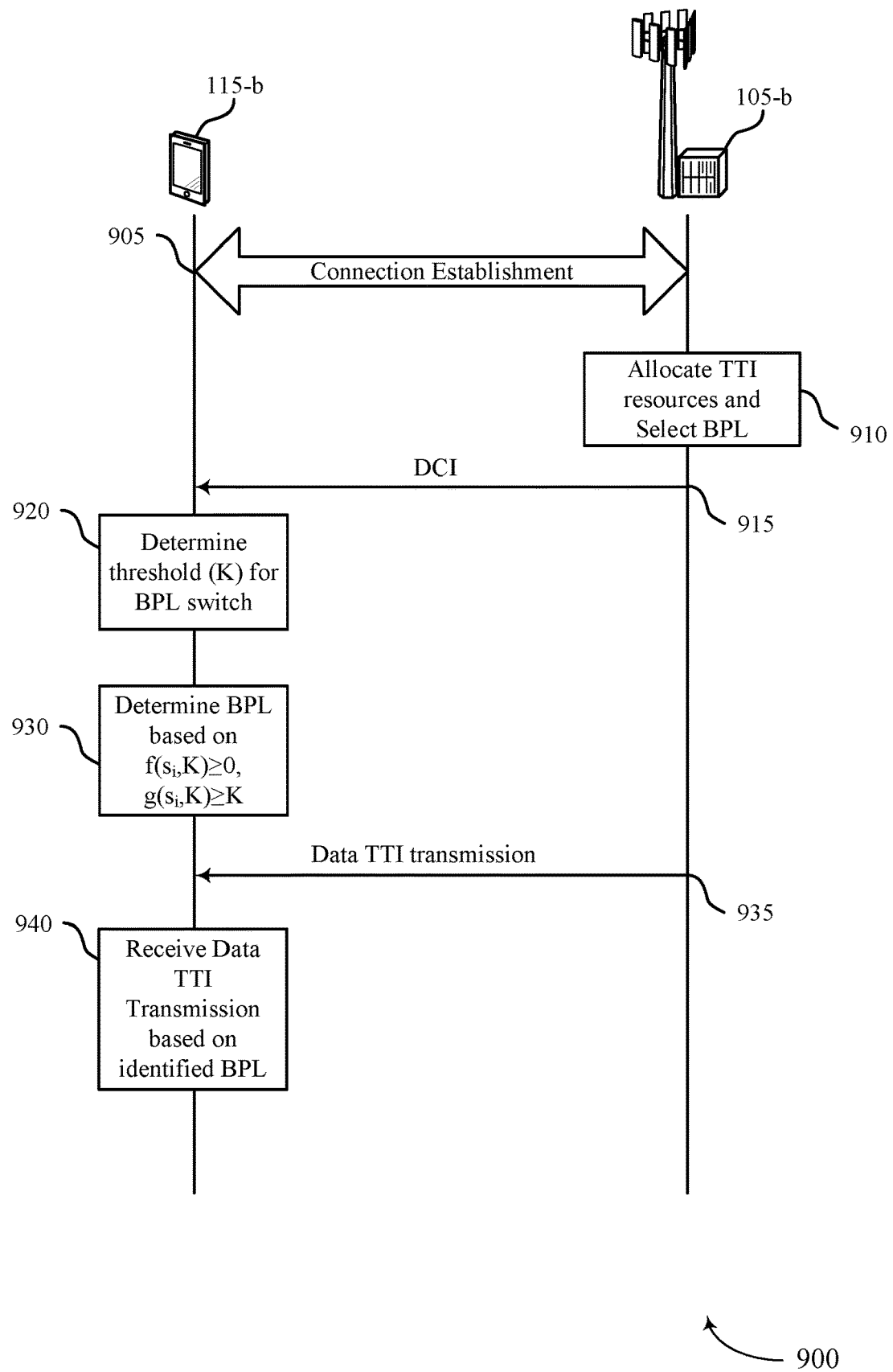
FIG. 9 illustrates an example of a process flow that supports methods for beam determination after beam pair link indication in accordance with aspects of the present disclosure.

FIG. 9 illustrates an example of a process flow 900 that supports methods for beam determination after beam pair link indication in accordance with various aspects of the present disclosure. In some examples, process flow 900 may implement aspects of wireless communication system 100. Process flow 900 may include a base station 105-b, and a UE 115-b, which may be examples of the corresponding devices of FIG. 1 or 2.

Initially, at 905, the UE 115-b and the base station 105-b may establish a connection. In some cases, the connection may be a mmW connection using a first BPL that is established between the base station 105-b and the UE 115-b. In some cases, a low-band connection may be established, or another high-band connection may be established which may be used to convey control information.

At 910, the base station 105-b may allocate a data TTI to the UE 115-b and select a BPL for the data TTI. In some cases, the allocation may be made based on data that is to be transmitted between the UE 115-b and the base station 105-b. In some cases, the base station 105-b may measure one or more channel quality parameters associated with one or more BPLs that may have been established during the connection establishment or afterward, and select the BPL based on the measurements. Additionally or alternatively, the UE 115-b may provide one or more measurement reports that the base station 105-b may use in determining a BPL to use for the data TTI. Channel quality measurements may be made according to established techniques, such as measurements based on one or more reference signal transmissions of the base station 105-b and the UE 115-b. The base station 105-b may transmit DCI 915 to the UE 115-b that indicates the allocated resources for the data TTI. As discussed above, the DCI 915 may also indicate a scheduling offset and a BPL indication. In some cases, the base station 105-b may indicate the BPL for the data TTI based on one of the techniques as discussed above.

At 920, the UE 115-d may determine a threshold value (K) for BPL switching. In some cases, the threshold value may be exchanged during connection establishment. As discussed above, the threshold value may correspond to a time that the UE 115-b may take to receive and decode DCI, and prepare a changed beam.

At block 930, the UE 115-b may determine a BPL for the data TTI, and potentially for one or more subsequent data TTIs, based on $f(s_i, K) \geq 0$, $g(s_i, K) \geq K$, as discussed above with respect to FIG. 8. The base station 105-b may transmit the data TTI transmission 935 using the BPL that is determined. In this example, the data TTI transmission 935 is a downlink transmission, although in other cases it may be an uplink transmission. At 940, the UE 115-b may receive the data TTI transmission based on the identified BPL.

Figure 10:
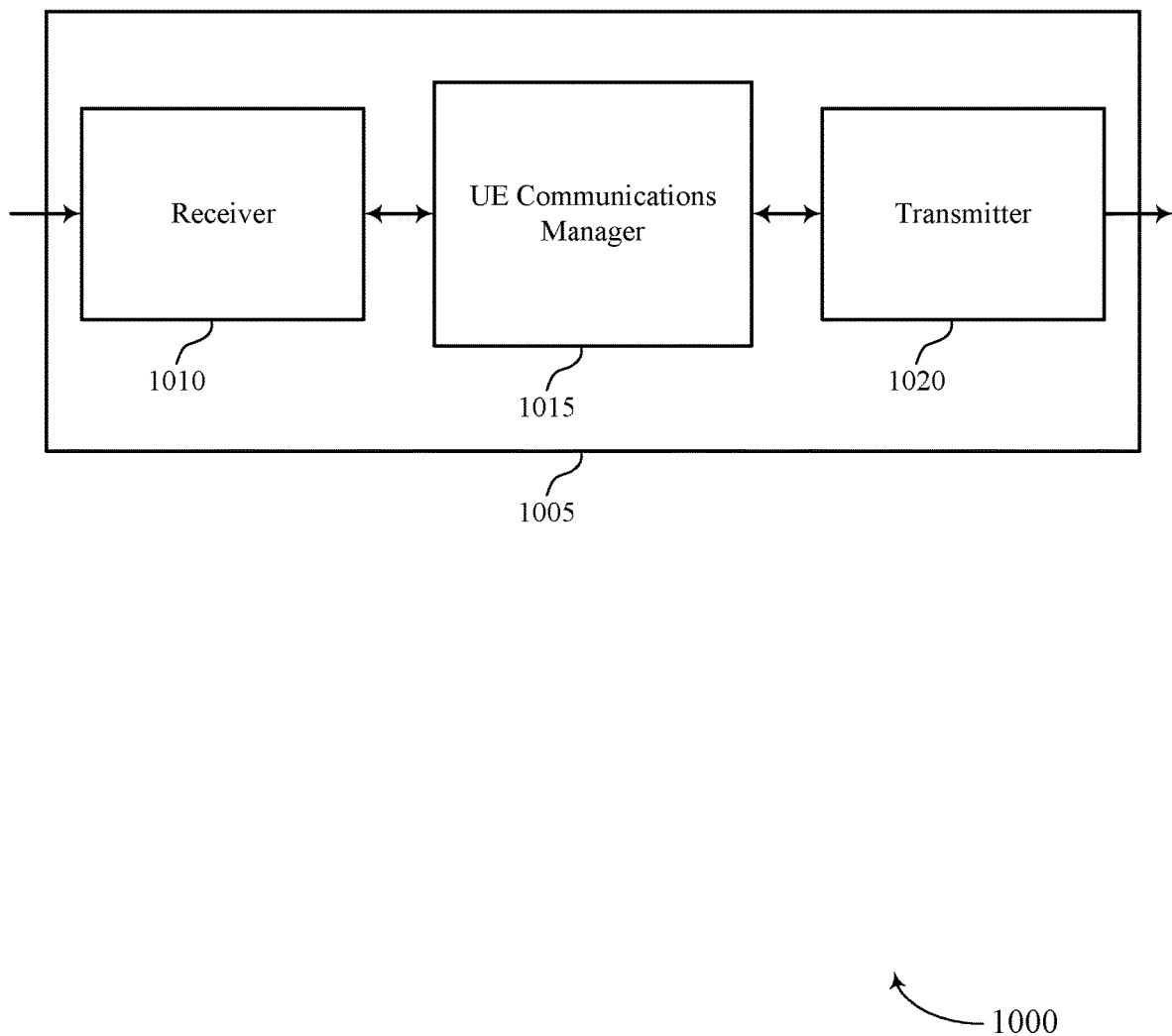
FIGS. 10 through 12 show block diagrams of a device that supports methods for beam determination after beam pair link indication in accordance with aspects of the present disclosure.

FIG. 10 shows a block diagram 1000 of a wireless device 1005 that supports methods for beam determination after beam pair link indication in accordance with aspects of the present disclosure. Wireless device 1005 may be an example of aspects of a user equipment (UE) 115 as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to methods for beam determination after beam pair link indication, etc.). Information may be passed on to other components of the device. The receiver 1010 may be an example of aspects of the transceiver 1335 described with reference to FIG. 13. The receiver 1010 may utilize a single antenna or a set of antennas.

UE communications manager 1015 may be an example of aspects of the UE communications manager 1315 described with reference to FIG. 13.

UE communications manager 1015 and/or at least some of its various sub-components may be implemented in hardware, software executed by a processor, firmware, or any combination thereof. If implemented in software executed by a processor, the functions of the UE communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 1015 and/or at least some of its various sub-components may be physically located at various positions, including being distributed such that portions of functions are implemented at different physical locations by one or more physical devices. In some examples, UE communications manager 1015 and/or at least some of its various sub-components may be a separate and distinct component in accordance with various aspects of the present disclosure. In other examples, UE communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1015 may establish, at a user equipment, a first connection with a base station using a first beam pair link (BPL), maintain a BPL for data, which is initialized with the first BPL and is used during data transmission time intervals (TTIs), identify a threshold value corresponding to an amount of time needed by the UE to decode an indication of a BPL switch and apply a different BPL than the first BPL based on the indication, receive a first control information transmission at a first time, the first control information transmission including a scheduling offset, an assignment for a first data TTI that starts at a second time corresponding to the first time plus the scheduling offset, and a BPL indication, determine, based on the threshold value and the scheduling offset, whether to switch the BPL for data and a switching time for making the switch, and switch the BPL for data to a second BPL at the switching time responsive to determining to switch the BPL for data.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
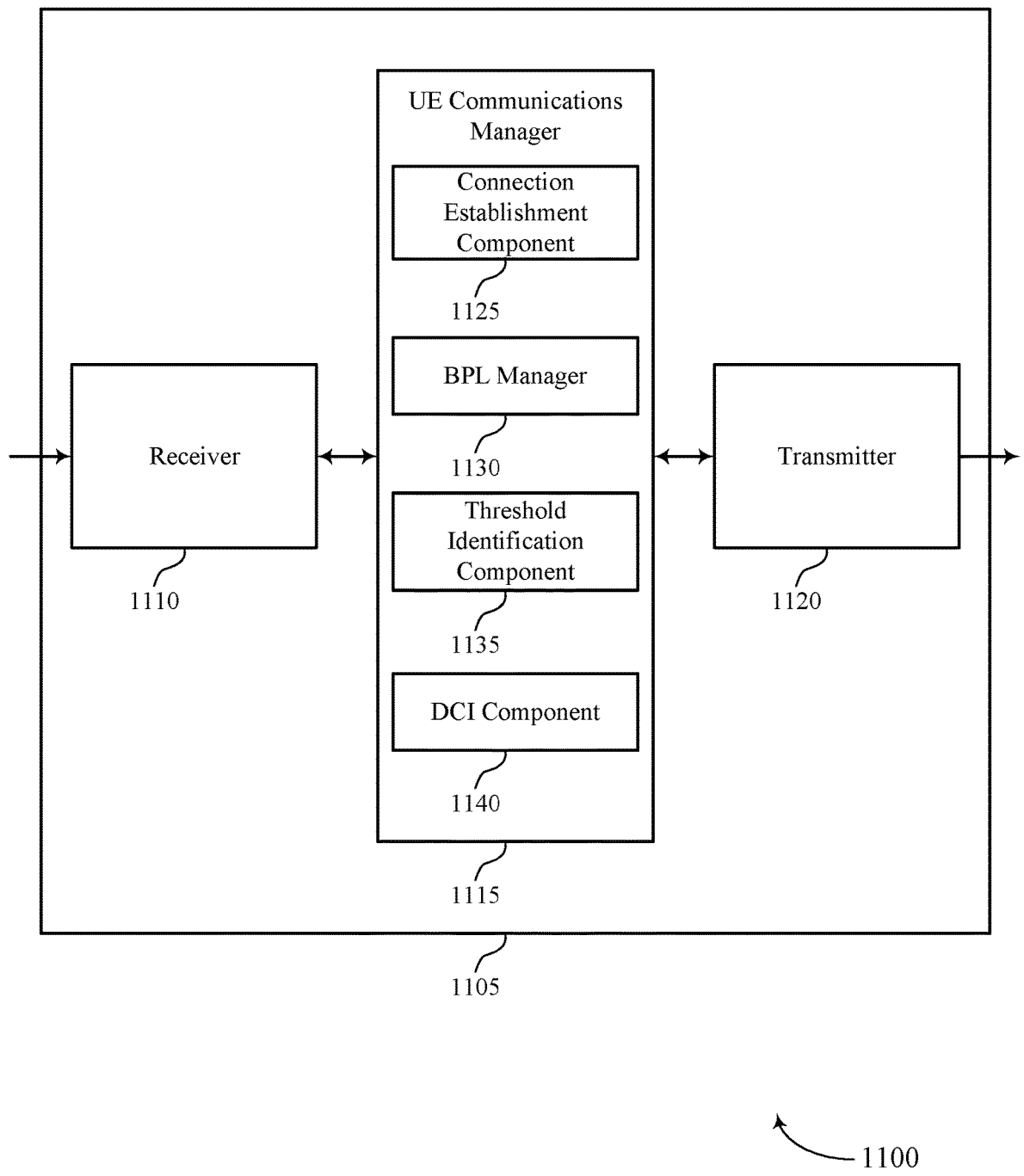

FIG. 11 shows a block diagram 1100 of a wireless device 1105 that supports methods for beam determination after beam pair link indication in accordance with aspects of the present disclosure. Wireless device 1105 may be an example of aspects of a wireless device 1005 or a UE 115 as described with reference to FIG. 10. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to methods for beam determination after beam pair link indication, etc.). Information may be passed on to other components of the device. The receiver 1110 may be an example of aspects of the transceiver 1335 described with reference to FIG. 13. The receiver 1110 may utilize a single antenna or a set of antennas.

UE communications manager 1115 may be an example of aspects of the UE communications manager 1315 described with reference to FIG. 13. UE communications manager 1115 may also include connection establishment component 1125, BPL manager 1130, threshold identification component 1135, and downlink control information (DCI) component 1140.

Connection establishment component 1125 may establish, at a user equipment, a first connection with a base station using a first beam pair link (BPL) for transmission of data TTIs. In some cases, the data TTIs include uplink data TTIs, downlink data TTIs, or combinations thereof.

BPL manager 1130 may maintain a BPL for data, which is initialized with the first BPL and is used during data transmission time intervals (TTIs). In some cases, the BPL may be determined based on a threshold value and scheduling offset, and the BPL manager 1130 may determine whether to switch the BPL for data and a switching time for making the switch. In cases where BPL manager 1130 determines to switch the BPL, it may switch the BPL for data to a second BPL at the switching time. In some cases, the determining includes determining to switch the BPL for data based on determining that the scheduling offset is greater than or equal to the threshold value, and to switch the BPL for data to the second BPL at the second time. In some cases, the determining includes determining to maintain the first BPL as the BPL for data based on determining that the scheduling offset is less than the threshold value. In some cases, the determining includes determining to switch the BPL for data to the second BPL, based on determining that the scheduling offset is less than the threshold value, effective starting at the first time plus the threshold value. In some cases, the determining includes determining to switch the BPL for data to the second BPL at the first time plus the threshold value irrespective of the scheduling offset.

Threshold identification component 1135 may identify the threshold value corresponding to an amount of time needed by the UE to decode an indication of a BPL switch and apply a different BPL than the first BPL based on the indication.

DCI component 1140 may receive a first control information transmission at a first time, the first control information transmission including a scheduling offset, an assignment for a first data TTI that starts at a second time corresponding to the first time plus the scheduling offset, and a BPL indication.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
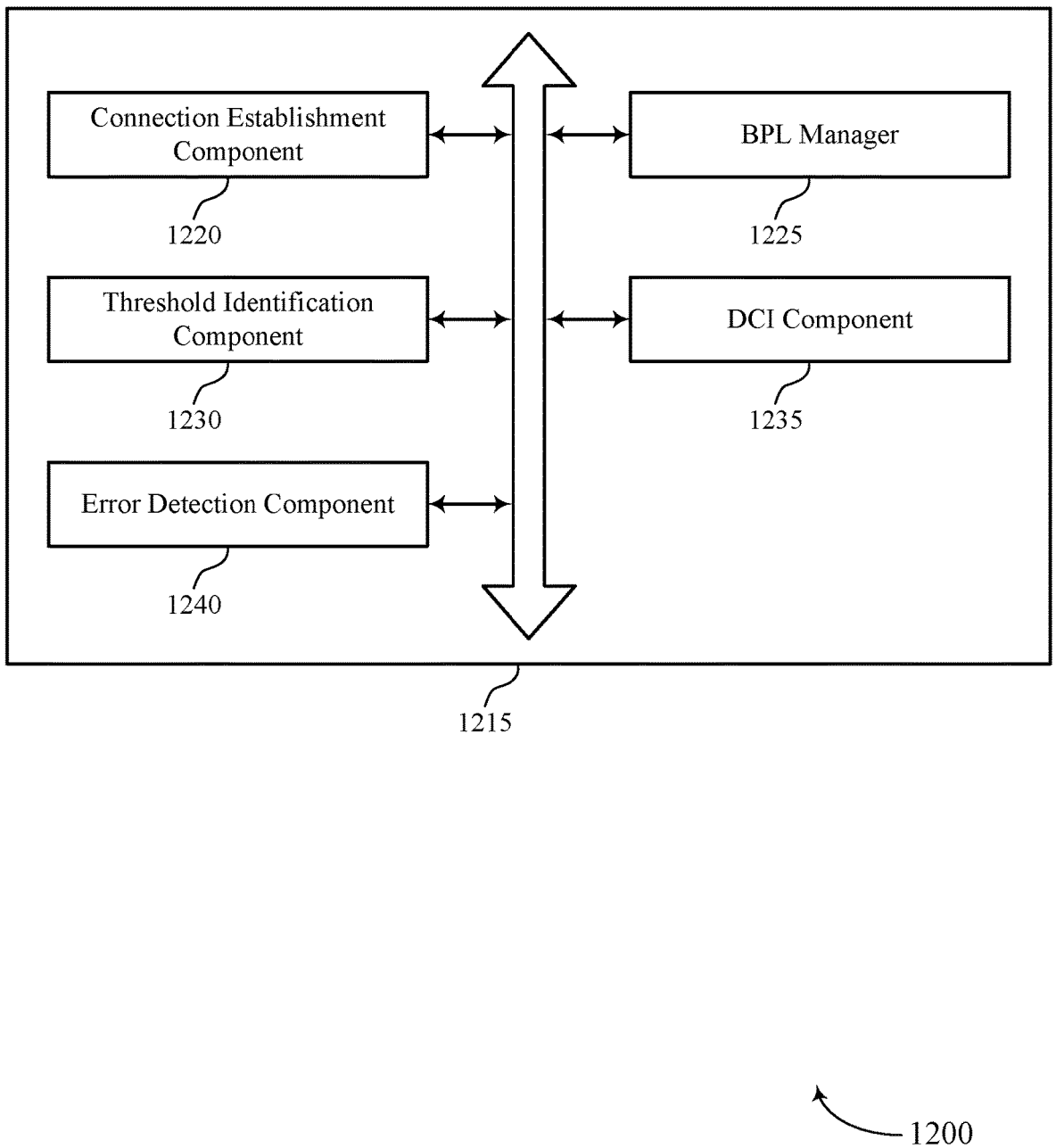

FIG. 12 shows a block diagram 1200 of a UE communications manager 1215 that supports methods for beam determination after beam pair link indication in accordance with aspects of the present disclosure. The UE communications manager 1215 may be an example of aspects of a UE communications manager 1015, a UE communications manager 1115, or a UE communications manager 1315 described with reference to FIGS. 10, 11, and 13. The UE communications manager 1215 may include connection establishment component 1220, BPL manager 1225, threshold identification component 1230, DCI component 1235, and error detection component 1240. Each of these modules may communicate, directly or indirectly, with one another (e.g., via one or more buses).

Connection establishment component 1220 may establish, at a user equipment, a first connection with a base station using a first beam pair link (BPL) for transmission of data TTIs. In some cases, the data TTIs include uplink data TTIs, downlink data TTIs, or combinations thereof.

BPL manager 1225 may maintain a BPL for data, which is initialized with the first BPL and is used during data transmission time intervals (TTIs). In some cases, the BPL may be determined based on a threshold value and scheduling offset, and the BPL manager 1225 may determine whether to switch the BPL for data and a switching time for making the switch. In cases where BPL manager 1225 determines to switch the BPL, it may switch the BPL for data to a second BPL at the switching time. In some cases, the determining includes determining to switch the BPL for data based on determining that the scheduling offset is greater than or equal to the threshold value, and to switch the BPL for data to the second BPL at the second time. In some cases, the determining includes determining to maintain the first BPL as the BPL for data based on determining that the scheduling offset is less than the threshold value. In some cases, the determining includes determining to switch the BPL for data to the second BPL, based on determining that the scheduling offset is less than the threshold value, effective starting at the first time plus the threshold value. In some cases, the determining includes determining to switch the BPL for data to the second BPL at the first time plus the threshold value irrespective of the scheduling offset.

Threshold identification component 1230 may identify a threshold value corresponding to an amount of time needed by the UE to decode an indication of a BPL switch and apply a different BPL than the first BPL based on the indication.

DCI component 1235 may receive a first control information transmission at a first time, the first control information transmission including a scheduling offset, an assignment for a first data TTI that starts at a second time corresponding to the first time plus the scheduling offset, and a BPL indication.

Error detection component 1240 may identify that an error in receiving a prior BPL indication has occurred based on determining that the scheduling offset is less than the threshold value, and the BPL indicated in the first control information transmission indicates the BPL used by the base station for the first data TTI differs from the first BPL and correct the BPL for data as maintained by the UE and using the corrected BPL for data after the first time plus the threshold value.

Figure 13:
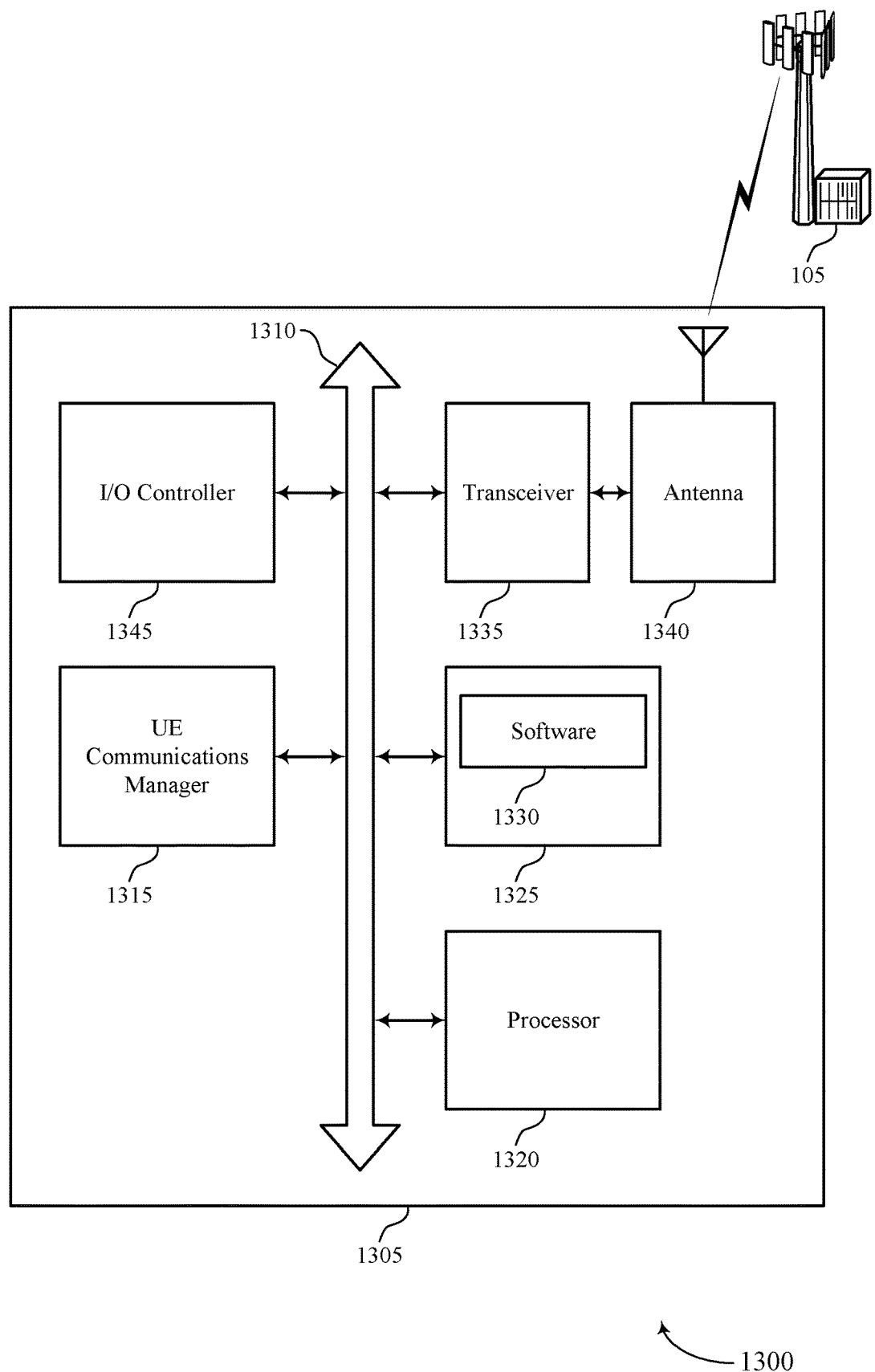
FIG. 13 illustrates a block diagram of a system including a UE that supports methods for beam determination after beam pair link indication in accordance with aspects of the present disclosure.

FIG. 13 shows a diagram of a system 1300 including a device 1305 that supports methods for beam determination after beam pair link indication in accordance with aspects of the present disclosure. Device 1305 may be an example of or include the components of wireless device 1005, wireless device 1105, or a UE 115 as described above, e.g., with reference to FIGS. 10 and 11. Device 1305 may include components for bi-directional voice and data communications including components for transmitting and receiving communications, including UE communications manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting methods for beam determination after beam pair link indication).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware or software operation such as the interaction with peripheral components or devices.

Software 1330 may include code to implement aspects of the present disclosure, including code to support methods for beam determination after beam pair link indication. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
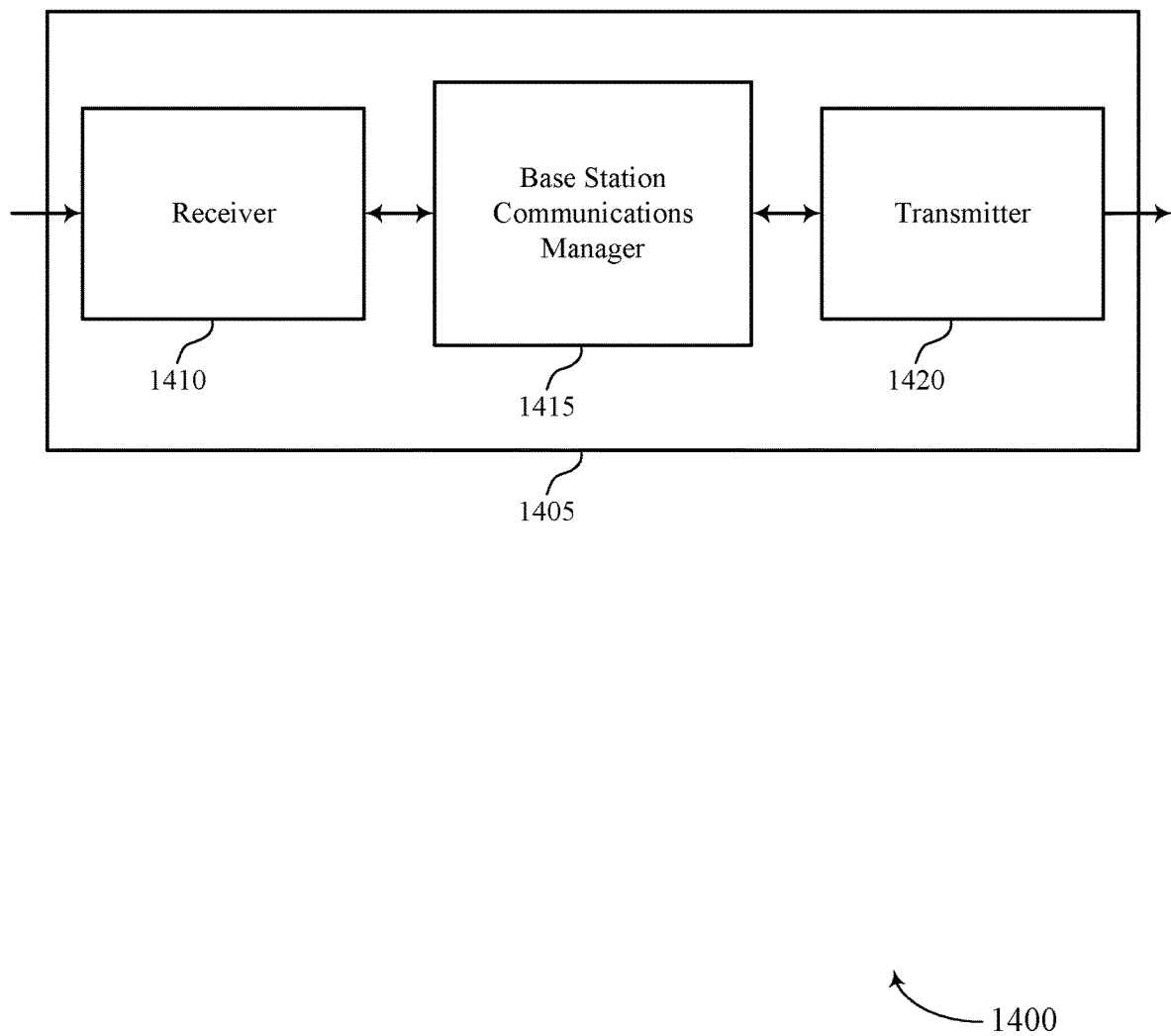
FIGS. 14 through 16 show block diagrams of a device that supports methods for beam determination after beam pair link indication in accordance with aspects of the present disclosure.

FIG. 14 shows a block diagram 1400 of a wireless device 1405 that supports methods for beam determination after beam pair link indication in accordance with aspects of the present disclosure. Wireless device 1405 may be an example of aspects of a base station 105 as described herein. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to methods for beam determination after beam pair link indication, etc.). Information may be passed on to other components of the device. The receiver 1410 may be an example of aspects of the transceiver 1735 described with reference to FIG. 17. The receiver 1410 may utilize a single antenna or a set of antennas.

Base station communications manager 1415 may be an example of aspects of the base station communications manager 1715 described with reference to FIG. 17.

Base station communications manager 1415 and/or at least some of its various sub-components may be implemented in hardware, software executed by a processor, firmware, or any combination thereof. If implemented in software executed by a processor, the functions of the base station communications manager 1415 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1415 and/or at least some of its various sub-components may be physically located at various positions, including being distributed such that portions of functions are implemented at different physical locations by one or more physical devices. In some examples, base station communications manager 1415 and/or at least some of its various sub-components may be a separate and distinct component in accordance with various aspects of the present disclosure. In other examples, base station communications manager 1415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1415 may establish, at a base station, a first connection with a UE using a first beam pair link (BPL), maintain a BPL for data, which is initialized with the first BPL and is used during data transmission time intervals (TTIs), change the BPL for data to a second BPL based at least on one or more channel conditions, identify a threshold value corresponding to an amount of time for the UE to decode an indication of a BPL switch and apply a different BPL based on the indication, allocate resources for the UE for a first data TTI, determine a scheduling offset between a control information transmission indicating the allocated resources and a start of the first data TTI, and transmit control information to the UE, the control information including the scheduling offset, an assignment for the first data TTI, and a BPL indication, and where the scheduling offset, a time of the control information transmission, the threshold value, and the BPL indication indicates to the UE whether the BPL for data will change and a BPL change time.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1735 described with reference to FIG. 17. The transmitter 1420 may utilize a single antenna or a set of antennas.

Figure 15:
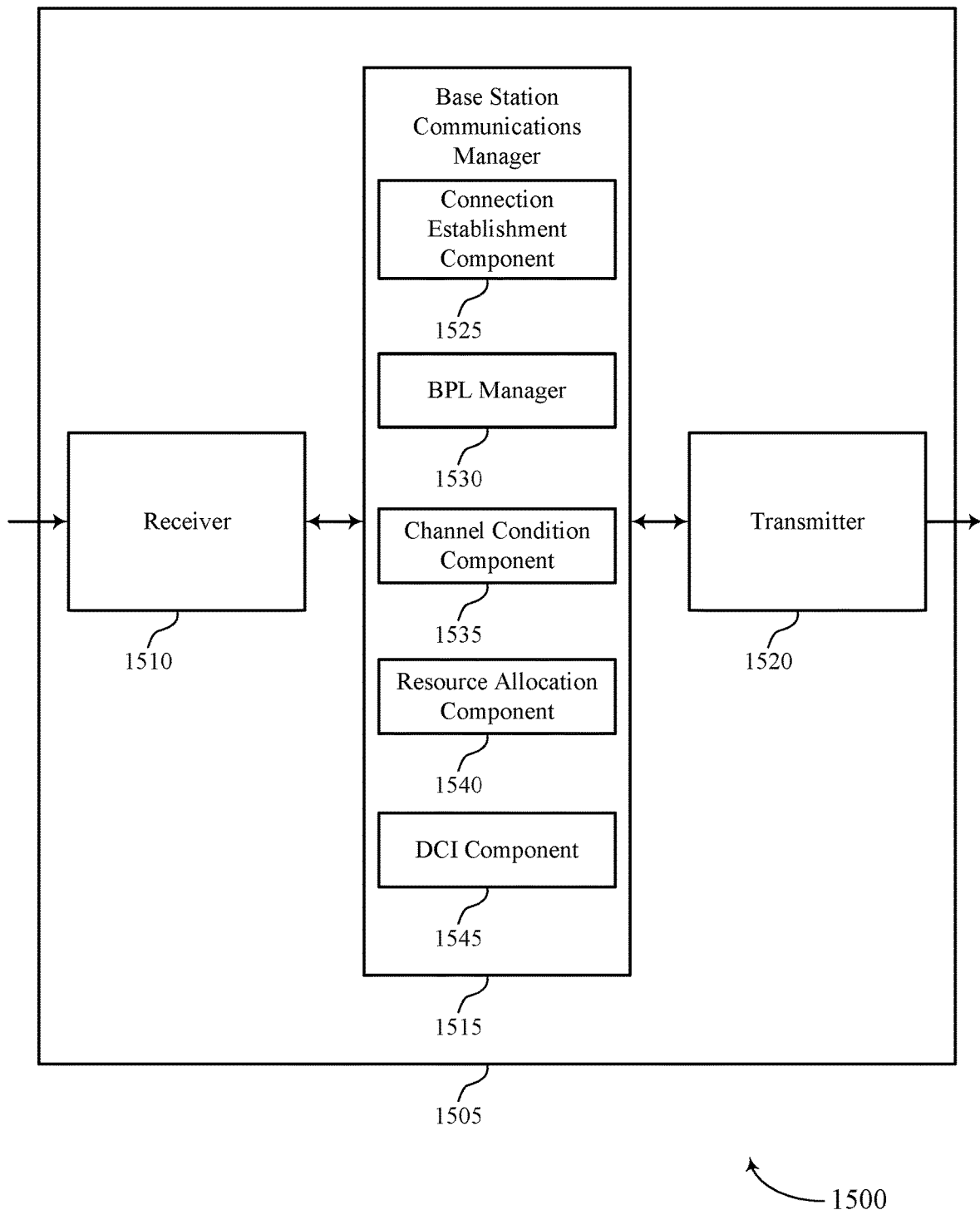

FIG. 15 shows a block diagram 1500 of a wireless device 1505 that supports methods for beam determination after beam pair link indication in accordance with aspects of the present disclosure. Wireless device 1505 may be an example of aspects of a wireless device 1405 or a base station 105 as described with reference to FIG. 14. Wireless device 1505 may include receiver 1510, base station communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to methods for beam determination after beam pair link indication, etc.). Information may be passed on to other components of the device. The receiver 1510 may be an example of aspects of the transceiver 1735 described with reference to FIG. 17. The receiver 1510 may utilize a single antenna or a set of antennas.

Base station communications manager 1515 may be an example of aspects of the base station communications manager 1715 described with reference to FIG. 17. Base station communications manager 1515 may also include connection establishment component 1525, BPL manager 1530, channel condition component 1535, resource allocation component 1540, and DCI component 1545.

Connection establishment component 1525 may establish, at a base station, a first connection with a UE using a first beam pair link (BPL) for transmission of data TTIs. In some cases, the data TTIs include uplink data TTIs, downlink data TTIs, or combinations thereof.

BPL manager 1530 may maintain a BPL for data, which is initialized with the first BPL and is used during data transmission time intervals (TTIs). In some cases, BPL manager 1530 may identify a threshold value corresponding to an amount of time for the UE to decode an indication of a BPL switch and apply a different BPL based on the indication. In some cases, BPL manager 1530 may determine not to convey a change of the BPL for data when the scheduling offset is less than the threshold value, and when the scheduling offset is less than the threshold value, the BPL indicated in the control information indicates the BPL used for the first data TTI. In some cases, a change of the BPL for data for the first data TTI is indicated by the scheduling offset being greater than or equal to the threshold value. In some cases, a change of the BPL for data is indicated by the scheduling offset being less than the threshold value, and the BPL change time corresponds to the time of the control information transmission plus the threshold value. In some cases, a change of the BPL for data is indicated irrespective of the scheduling offset, and the BPL change time corresponds to the time of the control information transmission plus the threshold value.

Channel condition component 1535 may change the BPL for data to a second BPL based at least on one or more channel conditions. Resource allocation component 1540 may allocate resources for the UE for a first data TTI.

DCI component 1545 may determine a scheduling offset between a control information transmission indicating the allocated resources and a start of the first data TTI and transmit control information to the UE, the control information including the scheduling offset, an assignment for the first data TTI, and a BPL indication, and where the scheduling offset, a time of the control information transmission, the threshold value, and the BPL indication indicates to the UE whether the BPL for data will change and a BPL change time.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1735 described with reference to FIG. 17. The transmitter 1520 may utilize a single antenna or a set of antennas.

Figure 16:
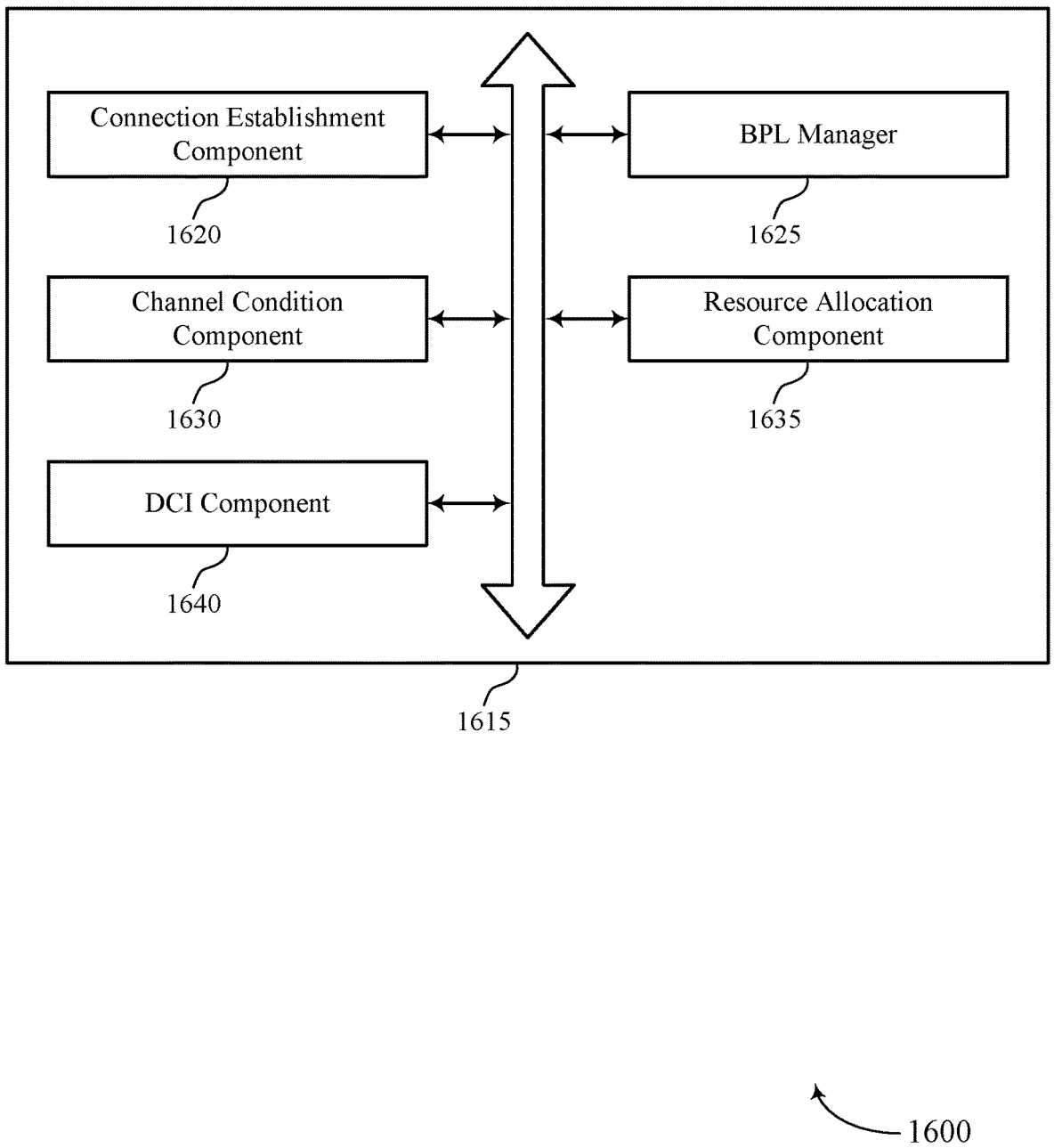

FIG. 16 shows a block diagram 1600 of a base station communications manager 1615 that supports methods for beam determination after beam pair link indication in accordance with aspects of the present disclosure. The base station communications manager 1615 may be an example of aspects of a base station communications manager 1715 described with reference to FIGS. 14, 15, and 17. The base station communications manager 1615 may include connection establishment component 1620, BPL manager 1625, channel condition component 1630, resource allocation component 1635, and DCI component 1640. Each of these modules may communicate, directly or indirectly, with one another (e.g., via one or more buses).

Connection establishment component 1620 may establish, at a base station, a first connection with a UE using a first beam pair link (BPL) for transmission of data TTIs. In some cases, the data TTIs include uplink data TTIs, downlink data TTIs, or combinations thereof.

BPL manager 1625 may maintain a BPL for data, which is initialized with the first BPL and is used during data transmission time intervals (TTIs). In some cases, BPL manager 1625 may identify a threshold value corresponding to an amount of time for the UE to decode an indication of a BPL switch and apply a different BPL based on the indication. In some cases, BPL manager 1625 may determine not to convey a change of the BPL for data when the scheduling offset is less than the threshold value, and when the scheduling offset is less than the threshold value, the BPL indicated in the control information indicates the BPL used for the first data TTI. In some cases, a change of the BPL for data for the first data TTI is indicated by the scheduling offset being greater than or equal to the threshold value. In some cases, a change of the BPL for data is indicated by the scheduling offset being less than the threshold value, and the BPL change time corresponds to the time of the control information transmission plus the threshold value. In some cases, a change of the BPL for data is indicated irrespective of the scheduling offset, and the BPL change time corresponds to the time of the control information transmission plus the threshold value.

Channel condition component 1630 may change the BPL for data to a second BPL based at least on one or more channel conditions.

Resource allocation component 1635 may allocate resources for the UE for a first data TTI.

DCI component 1640 may determine a scheduling offset between a control information transmission indicating the allocated resources and a start of the first data TTI and transmit control information to the UE, the control information including the scheduling offset, an assignment for the first data TTI, and a BPL indication, and where the scheduling offset, a time of the control information transmission, the threshold value, and the BPL indication indicates to the UE whether the BPL for data will change and a BPL change time.

Figure 17:
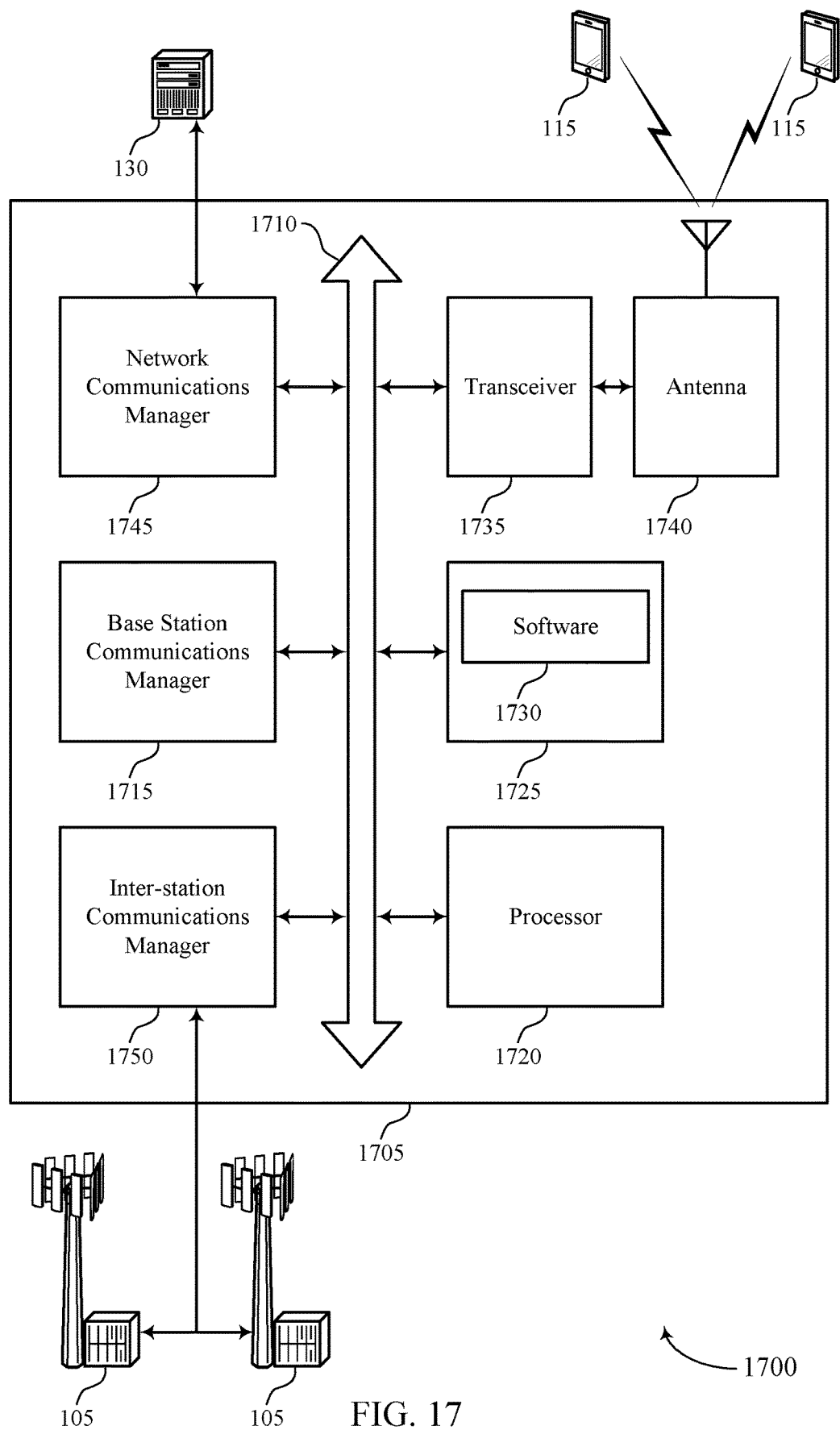
FIG. 17 illustrates a block diagram of a system including a base station that supports methods for beam determination after beam pair link indication in accordance with aspects of the present disclosure.

FIG. 17 shows a diagram of a system 1700 including a device 1705 that supports methods for beam determination after beam pair link indication in accordance with aspects of the present disclosure. Device 1705 may be an example of or include the components of base station 105 as described above, e.g., with reference to FIG. 1. Device 1705 may include components for b$_i$-directional voice and data communications including components for transmitting and receiving communications, including base station communications manager 1715, processor 1720, memory 1725, software 1730, transceiver 1735, antenna 1740, network communications manager 1745, and inter-station communications manager 1750. These components may be in electronic communication via one or more buses (e.g., bus 1710). Device 1705 may communicate wirelessly with one or more UEs 115.

Processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting methods for beam determination after beam pair link indication).

Memory 1725 may include RAM and ROM. The memory 1725 may store computer-readable, computer-executable software 1730 including instructions that, when executed, cause the processor to perform various functions described herein. In some cases, the memory 1725 may contain, among other things, a BIOS which may control basic hardware or software operation such as the interaction with peripheral components or devices.

Software 1730 may include code to implement aspects of the present disclosure, including code to support methods for beam determination after beam pair link indication. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas.

In some cases, the wireless device may include a single antenna 1740. However, in some cases the device may have more than one antenna 1740, which may be capable of concurrently transmitting or receiving multiple wireless transmissions.

Network communications manager 1745 may manage communications with the core network (e.g., via one or more wired backhaul links). For example, the network communications manager 1745 may manage the transfer of data communications for client devices, such as one or more UEs 115.

Inter-station communications manager 1750 may manage communications with other base station 105, and may include a controller or scheduler for controlling communications with UEs 115 in cooperation with other base stations 105. For example, the inter-station communications manager 1750 may coordinate scheduling for transmissions to UEs 115 for various interference mitigation techniques such as beamforming or joint transmission. In some examples, inter-station communications manager 1750 may provide an X2 interface within an Long Term Evolution (LTE)/LTE-A wireless communication network technology to provide communication between base stations 105.

Figure 18:
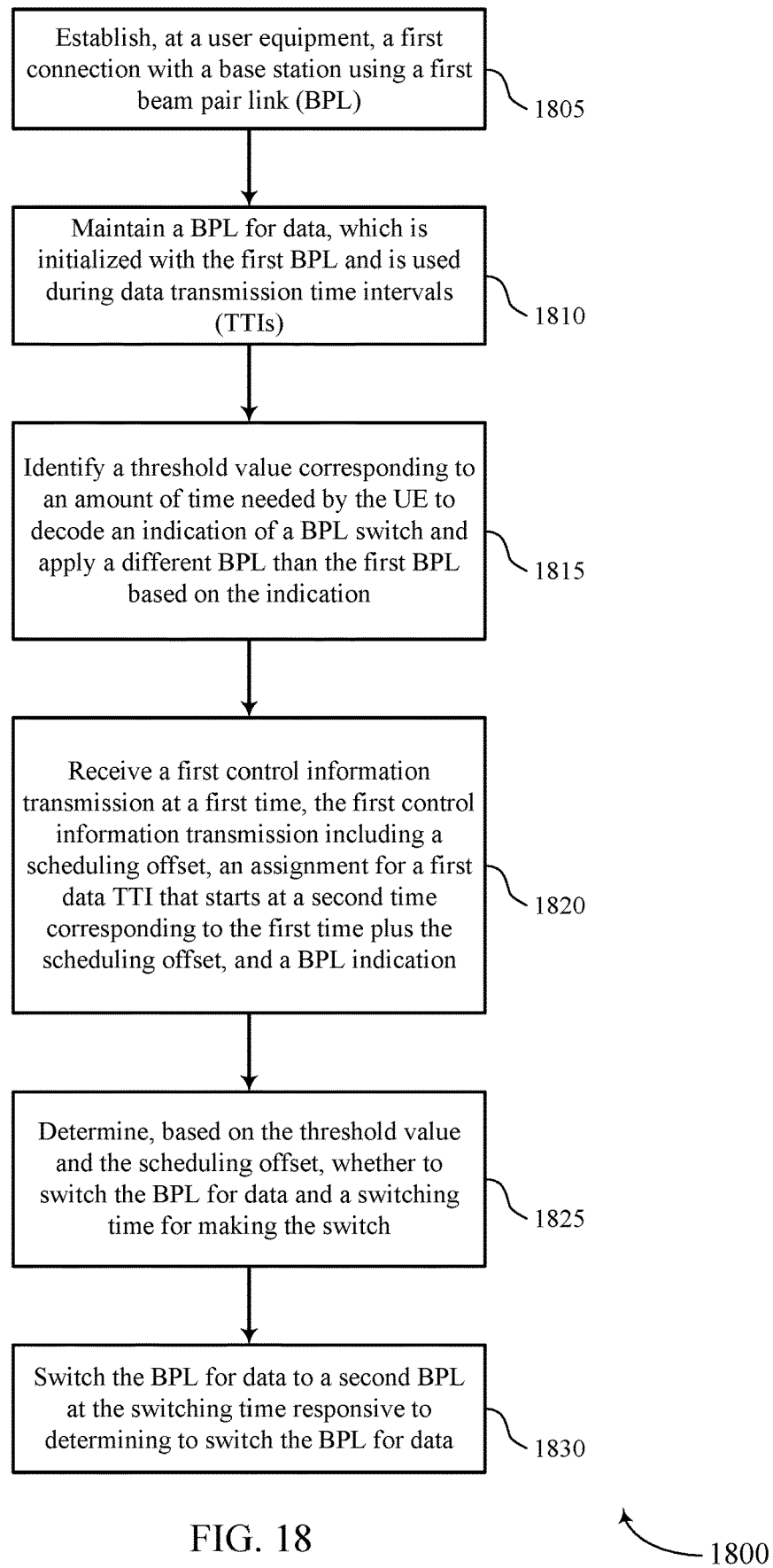
FIGS. 18 through 20 illustrate methods for methods for beam determination after beam pair link indication in accordance with aspects of the present disclosure.

FIG. 18 shows a flowchart illustrating a method 1800 for methods for beam determination after beam pair link indication in accordance with aspects of the present disclosure. The operations of method 1800 may be implemented by a UE 115 or its components as described herein. For example, the operations of method 1800 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may establish, at a user equipment, a first connection with a base station using a first beam pair link (BPL). The operations of 1805 may be performed according to the methods described herein. In certain examples, aspects of the operations of 1805 may be performed by a connection establishment component as described with reference to FIGS. 10 through 13.

At 1810 the UE 115 may maintain a BPL for data, which is initialized with the first BPL and is used during data transmission time intervals (TTIs). The operations of 1810 may be performed according to the methods described herein. In certain examples, aspects of the operations of 1810 may be performed by a BPL manager as described with reference to FIGS. 10 through 13.

At 1815 the UE 115 may identify a threshold value corresponding to an amount of time needed by the UE to decode an indication of a BPL switch and apply a different BPL than the first BPL based at least in part on the indication. The operations of 1815 may be performed according to the methods described herein. In certain examples, aspects of the operations of 1815 may be performed by a threshold identification component as described with reference to FIGS. 10 through 13.

At 1820 the UE 115 may receive a first control information transmission at a first time, the first control information transmission including a scheduling offset, an assignment for a first data TTI that starts at a second time corresponding to the first time plus the scheduling offset, and a BPL indication. The operations of 1820 may be performed according to the methods described herein. In certain examples, aspects of the operations of 1820 may be performed by a DCI component as described with reference to FIGS. 10 through 13.

At 1825 the UE 115 may determine, based at least in part on the threshold value and the scheduling offset, whether to switch the BPL for data and a switching time for making the switch. The operations of 1825 may be performed according to the methods described herein. In certain examples, aspects of the operations of 1825 may be performed by a BPL manager as described with reference to FIGS. 10 through 13. In some cases, the determining comprises determining to switch the BPL for data to the second BPL, based at least in part on determining that the scheduling offset is less than the threshold value, effective starting at the first time plus the threshold value. In some cases, the determining comprises determining to switch the BPL for data to the second BPL at the first time plus the threshold value irrespective of the scheduling offset.

At 1830 the UE 115 may switch the BPL for data to a second BPL at the switching time responsive to determining to switch the BPL for data. The operations of 1830 may be performed according to the methods described herein. In certain examples, aspects of the operations of 1830 may be performed by a BPL manager as described with reference to FIGS. 10 through 13.

Utilizing techniques such as method 1800, the base station 105, the UE 115, or both, may periodically measure one or more channel conditions and may determine whether the first BPL, or a different second BPL, may be more suitable for subsequent transmissions. Upon determining that the second BPL should be used for subsequent transmissions at the base station 105 (e.g., through channel measurements or receiving signaling from the UE 115 with channel measurements), the second BPL may be indicated to the UE 115 in a control information transmission (e.g., a DCI transmission using a PDCCH). Depending upon the scheduling offset and the threshold value for receiving control information and changing BPLs at the UE 115, the UE 115 may receive the control information and determine whether the BPL is to be changed. Such techniques may improve network efficiency through transmissions using favorable BPLs, which may support higher data rates, lower error rates, or combinations thereof.

Figure 19:
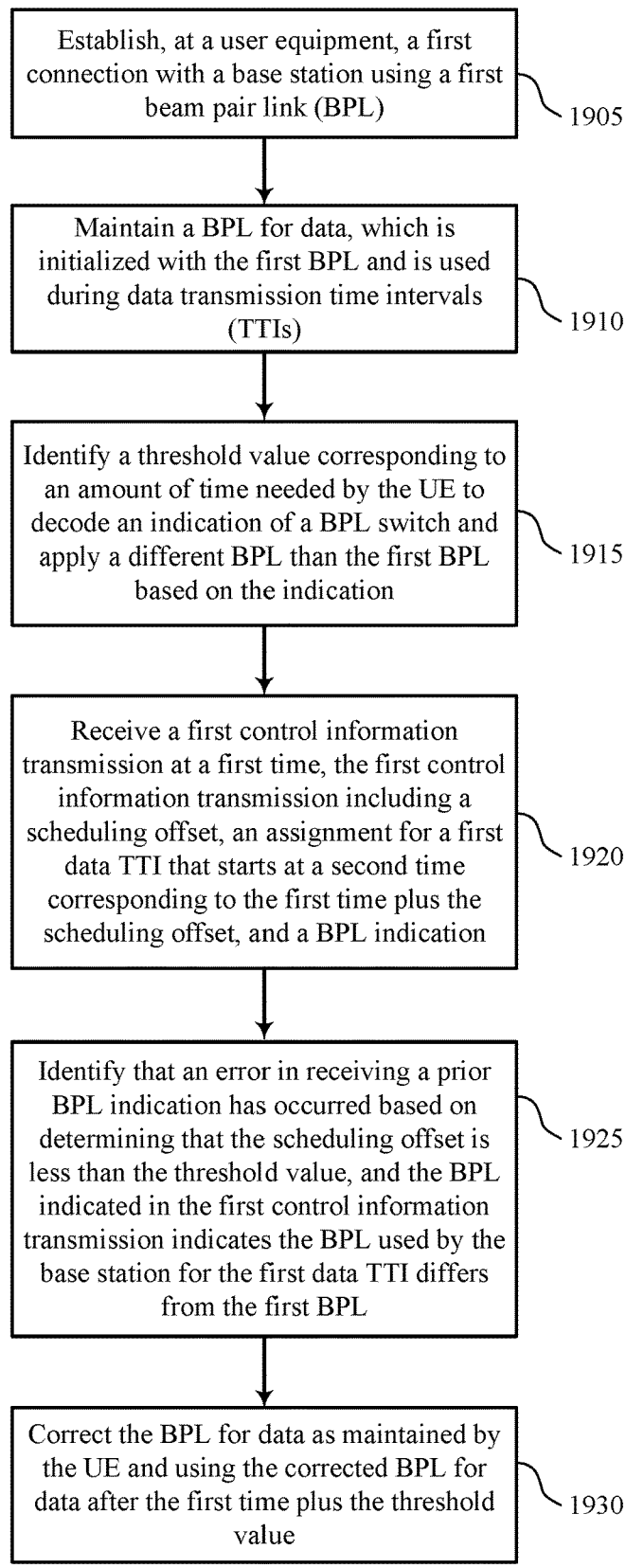

FIG. 19 shows a flowchart illustrating a method 1900 for methods for beam determination after beam pair link indication in accordance with aspects of the present disclosure. The operations of method 1900 may be implemented by a UE 115 or its components as described herein. For example, the operations of method 1900 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At 1905 the UE 115 may establish, at a user equipment, a first connection with a base station using a first beam pair link (BPL). The operations of 1905 may be performed according to the methods described herein. In certain examples, aspects of the operations of 1905 may be performed by a connection establishment component as described with reference to FIGS. 10 through 13.

At 1910 the UE 115 may maintain a BPL for data, which is initialized with the first BPL and is used during data transmission time intervals (TTIs). The operations of 1910 may be performed according to the methods described herein. In certain examples, aspects of the operations of 1910 may be performed by a BPL manager as described with reference to FIGS. 10 through 13.

At 1915 the UE 115 may identify a threshold value corresponding to an amount of time needed by the UE to decode an indication of a BPL switch and apply a different BPL than the first BPL based at least in part on the indication. The operations of 1915 may be performed according to the methods described herein. In certain examples, aspects of the operations of 1915 may be performed by a threshold identification component as described with reference to FIGS. 10 through 13.

At 1920 the UE 115 may receive a first control information transmission at a first time, the first control information transmission including a scheduling offset, an assignment for a first data TTI that starts at a second time corresponding to the first time plus the scheduling offset, and a BPL indication. The operations of 1920 may be performed according to the methods described herein. In certain examples, aspects of the operations of 1920 may be performed by a DCI component as described with reference to FIGS. 10 through 13.

At 1925 the UE 115 may identify that an error in receiving a prior BPL indication has occurred based at least in part on determining that the scheduling offset is less than the threshold value, and the BPL indicated in the first control information transmission indicates the BPL used by the base station for the first data TTI differs from the first BPL. The operations of 1925 may be performed according to the methods described herein. In certain examples, aspects of the operations of 1925 may be performed by an error detection component as described with reference to FIGS. 10 through 13.

At 1930 the UE 115 may correct the BPL for data as maintained by the UE and using the corrected BPL for data after the first time plus the threshold value. The operations of 1930 may be performed according to the methods described herein. In certain examples, aspects of the operations of 1930 may be performed by an error detection component as described with reference to FIGS. 10 through 13.

Utilizing techniques such as method 1900, the base station 105, the UE 115, or both, may periodically measure one or more channel conditions and may determine whether the first BPL, or a different second BPL, may be more suitable for subsequent transmissions. Upon determining that the second BPL should be used for subsequent transmissions at the base station 105 (e.g., through channel measurements or receiving signaling from the UE 115 with channel measurements), the second BPL may be indicated to the UE 115 in a control information transmission (e.g., a DCI transmission using a PDCCH). Depending upon the scheduling offset and the threshold value for receiving control information and changing BPLs at the UE 115, the UE 115 may receive the control information and determine whether the BPL is to be changed. Such techniques may improve network efficiency through transmissions using favorable BPLs, which may support higher data rates, lower error rates, or combinations thereof.

Figure 20:
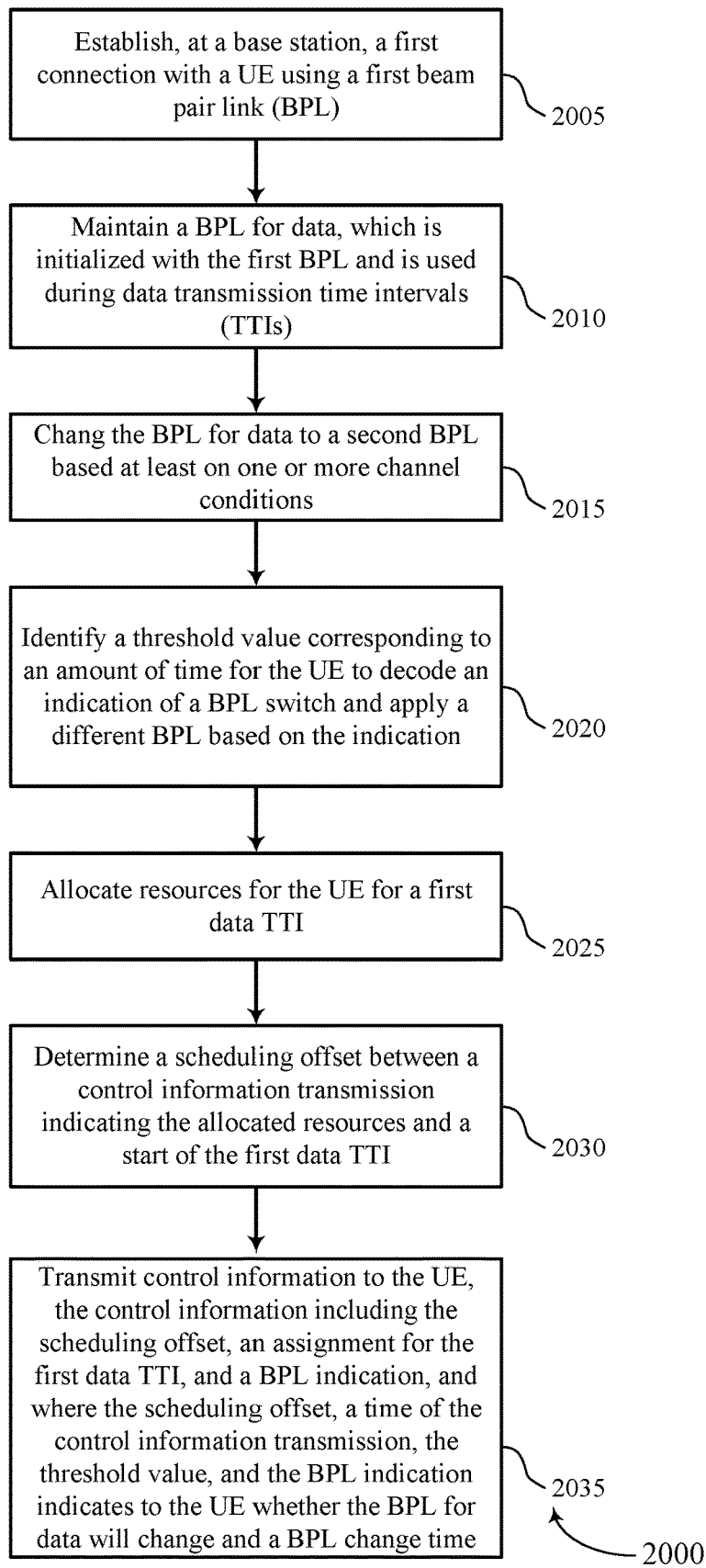

FIG. 20 shows a flowchart illustrating a method 2000 for methods for beam determination after beam pair link indication in accordance with aspects of the present disclosure. The operations of method 2000 may be implemented by a base station 105 or its components as described herein. For example, the operations of method 2000 may be performed by a base station communications manager as described with reference to FIGS. 14 through 17. In some examples, a base station 105 may execute a set of codes to control the functional elements of the device to perform the functions described below. Additionally or alternatively, the base station 105 may perform aspects of the functions described below using special-purpose hardware.

At 2005 the base station 105 may establish, at a base station, a first connection with a user equipment (UE) using a first beam pair link (BPL). The operations of 2005 may be performed according to the methods described herein. In certain examples, aspects of the operations of 2005 may be performed by a connection establishment component as described with reference to FIGS. 14 through 17.

At 2010 the base station 105 may maintain a BPL for data, which is initialized with the first BPL and is used during data transmission time intervals (TTIs). The operations of 2010 may be performed according to the methods described herein. In certain examples, aspects of the operations of 2010 may be performed by a BPL manager as described with reference to FIGS. 14 through 17.

At 2015 the base station 105 may change the BPL for data to a second BPL based at least on one or more channel conditions. The operations of 2015 may be performed according to the methods described herein. In certain examples, aspects of the operations of 2015 may be performed by a channel condition component as described with reference to FIGS. 14 through 17.

At 2020 the base station 105 may identify a threshold value corresponding to an amount of time for the UE to decode an indication of a BPL switch and apply a different BPL based at least in part on the indication. The operations of 2020 may be performed according to the methods described herein. In certain examples, aspects of the operations of 2020 may be performed by a BPL manager as described with reference to FIGS. 14 through 17.

At 2025 the base station 105 may allocate resources for the UE for a first data TTI. The operations of 2025 may be performed according to the methods described herein. In certain examples, aspects of the operations of 2025 may be performed by a resource allocation component as described with reference to FIGS. 14 through 17.

At 2030 the base station 105 may determine a scheduling offset between a control information transmission indicating the allocated resources and a start of the first data TTI. The operations of 2030 may be performed according to the methods described herein. In certain examples, aspects of the operations of 2030 may be performed by a DCI component as described with reference to FIGS. 14 through 17.

At 2035 the base station 105 may transmit control information to the UE, the control information including the scheduling offset, an assignment for the first data TTI, and a BPL indication, and wherein the scheduling offset, a time of the control information transmission, the threshold value, and the BPL indication indicates to the UE whether the BPL for data will change and a BPL change time. The operations of 2035 may be performed according to the methods described herein. In certain examples, aspects of the operations of 2035 may be performed by a DCI component as described with reference to FIGS. 14 through 17. In some cases, the base station may determine not to convey a change of the BPL for data when the scheduling offset is less than the threshold value. In other cases, when the scheduling offset is less than the threshold value, the BPL indicated in the control information indicates the BPL used for the first data TTI. In some cases, a change of the BPL for data is indicated by the scheduling offset being less than the threshold value, and the BPL change time corresponds to the time of the control information transmission plus the threshold value. In some cases, a change of the BPL for data is indicated irrespective of the scheduling offset, and the BPL change time corresponds to the time of the control information transmission plus the threshold value.

Utilizing techniques such as method 2000, the base station 105, the UE 115, or both, may periodically measure one or more channel conditions and may determine whether the first BPL, or a different second BPL, may be more suitable for subsequent transmissions. Upon determining that the second BPL should be used for subsequent transmissions at the base station 105 (e.g., through channel measurements or receiving signaling from the UE 115 with channel measurements), the second BPL may be indicated to the UE 115 in a control information transmission (e.g., a DCI transmission using a PDCCH). Depending upon the scheduling offset and the threshold value for receiving control information and changing BPLs at the UE 115, the UE 115 may receive the control information and determine whether the BPL is to be changed. Such techniques may improve network efficiency through transmissions using favorable BPLs, which may support higher data rates, lower error rates, or combinations thereof.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of wireless communication at a user equipment (UE) comprising:
    receiving a first control information transmission from a base station at a first time, the first control information transmission including a scheduling offset, an assignment for a first data TTI that starts at a second time corresponding to the first time plus the scheduling offset, and a beam pair link (BPL) indication, the BPL indication indicating a different BPL for data than a current BPL;
    determining whether to switch to the different BPL for data based at least in part on whether the scheduling offset is less than a threshold time value for the UE or the scheduling offset is equal to or greater than the threshold time value for the UE, wherein the threshold value for the UE is a threshold time amount to decode the first control information and to switch the BPL according to the indication; and
    communicating with the base station during the first data TTI based on the determination.

2. The method of claim 1, wherein communicating with the base station during the first TTI based on the determination comprises switching to the different BPL for data to receive downlink data from the base station during the first TTI based on the scheduling offset being equal to or greater than the threshold time amount.

3. The method of claim 1, further comprising transmitting an indication of the threshold time amount to the base station prior to the receiving the first control information from the base station.

* * * * *